(12) United States Patent
Tai et al.

(10) Patent No.: US 12,554,482 B2
(45) Date of Patent: Feb. 17, 2026

(54) COMPONENT UPDATES IN A MULTI COMPONENT NETWORK

(71) Applicant: View, Inc., Milpitas, CA (US)

(72) Inventors: Daniel Dah Tai, San Jose, CA (US); Mahender Reddy Vangati, San Jose, CA (US); Darrel Q. Pham, San Jose, CA (US); Ralph Donald Fox, Livermore, CA (US); Shih-Chieh Lee, Mountain View, CA (US); Tyler Eliot Peterson, San Jose, CA (US)

(73) Assignee: View Operating Corporation, San Jose, CA (US)

( * ) Notice: Subject to any disclaimer, the term of this patent is extended or adjusted under 35 U.S.C. 154(b) by 201 days.

(21) Appl. No.: 18/037,067

(22) PCT Filed: Dec. 10, 2021

(86) PCT No.: PCT/US2021/062774
§ 371 (c)(1),
(2) Date: May 15, 2023

(87) PCT Pub. No.: WO2022/125873
PCT Pub. Date: Jun. 16, 2022

(65) Prior Publication Data
US 2023/0367584 A1    Nov. 16, 2023

Related U.S. Application Data

(60) Provisional application No. 63/124,673, filed on Dec. 11, 2020.

(51) Int. Cl.
*G06F 8/656* (2018.01)
*H04L 67/12* (2022.01)

(52) U.S. Cl.
CPC .............. *G06F 8/656* (2018.02); *H04L 67/12* (2013.01)

(58) Field of Classification Search
CPC .................. G06F 8/656; H04L 67/12
(Continued)

(56) References Cited

U.S. PATENT DOCUMENTS

| 4,340,813 A | 7/1982 | Sauer |
| 5,729,824 A | 3/1998 | O'Neill et al. |

(Continued)

FOREIGN PATENT DOCUMENTS

| AU | 2015101660 A4 | 12/2015 |
| CN | 1808505 A | 7/2006 |

(Continued)

OTHER PUBLICATIONS

Liu, Muqing, et al. "Security analysis of vendor customized code in firmware of embedded device." Security and Privacy in Communication Networks: 12th International Conference, SecureComm 2016, Guangzhou, China, Oct. 10-12, 2016, Proceedings 12. Springer International Publishing, 2017. pp. 722-739 (Year: 2016).*

(Continued)

*Primary Examiner* — Satish Rampuria
(74) *Attorney, Agent, or Firm* — Cha & Reiter, LLC.

(57) ABSTRACT

One or more components (e.g., devices) and/or component ensembles coupled to a local network utilize updatable software and/or firmware to perform, The component(s) (e.g., and ensembles thereof) can be updated using a scheme that enables recognition of the component(s) among a plurality of components, recognize the respective firmware and/or software versions, and targets relevant update(s) to component(s) requiring update.

20 Claims, 7 Drawing Sheets

(58) Field of Classification Search
USPC .................................................. 717/120–178
See application file for complete search history.

(56) References Cited

U.S. PATENT DOCUMENTS

| | | | |
|---|---|---|---|
| 6,032,020 A | 2/2000 | Cook et al. | |
| 6,104,513 A | 8/2000 | Bloom | |
| 6,588,250 B2 | 7/2003 | Schell | |
| 6,897,936 B1 | 5/2005 | Li et al. | |
| 6,965,813 B2 | 11/2005 | Granqvist et al. | |
| 7,031,727 B2 | 4/2006 | Baskin | |
| 7,111,952 B2 | 9/2006 | Veskovic | |
| 7,310,355 B1 | 12/2007 | Krein et al. | |
| 7,382,636 B2 | 6/2008 | Baarman et al. | |
| 7,554,437 B2 | 6/2009 | Axelsen | |
| 7,588,067 B2 | 9/2009 | Veskovic | |
| 7,610,910 B2 | 11/2009 | Ahmed | |
| 7,629,400 B2 | 12/2009 | Hyman | |
| 7,797,367 B1 | 9/2010 | Gelvin et al. | |
| 7,911,348 B2 | 3/2011 | Rodgers | |
| 7,950,827 B2 | 5/2011 | Veskovic | |
| 7,963,675 B2 | 6/2011 | Veskovic | |
| 7,966,078 B2 | 6/2011 | Hoffberg et al. | |
| 8,022,977 B2 | 9/2011 | Kanade et al. | |
| 8,024,073 B2 | 9/2011 | Imes et al. | |
| 8,086,433 B2 | 12/2011 | Lee et al. | |
| 8,214,494 B1 | 7/2012 | Slavin | |
| 8,249,731 B2 | 8/2012 | Tran et al. | |
| 8,509,400 B2 | 8/2013 | Liu et al. | |
| 8,705,162 B2 | 4/2014 | Brown et al. | |
| 8,711,465 B2 | 4/2014 | Bhatnagar et al. | |
| 8,764,950 B2 | 7/2014 | Wang et al. | |
| 8,769,525 B2* | 7/2014 | Dirstine | G06F 8/65 717/173 |
| 8,927,069 B1 | 1/2015 | Estinto et al. | |
| 8,966,469 B2* | 2/2015 | Nakamoto | G06F 8/65 717/169 |
| 9,121,837 B2 | 9/2015 | Chan et al. | |
| 9,470,947 B2 | 10/2016 | Nagel et al. | |
| 9,546,515 B2 | 1/2017 | Hall et al. | |
| 9,551,913 B2 | 1/2017 | Kim et al. | |
| 9,715,242 B2 | 7/2017 | Pillai et al. | |
| 9,898,912 B1 | 2/2018 | Jordan, II et al. | |
| 9,930,463 B2 | 3/2018 | Little | |
| 9,965,865 B1 | 5/2018 | Agrawal et al. | |
| 10,156,852 B2 | 12/2018 | Bakhishev et al. | |
| 10,178,638 B1 | 1/2019 | Stamatakis et al. | |
| 10,289,094 B2 | 5/2019 | Ashdown et al. | |
| 10,322,680 B2 | 6/2019 | Terashima et al. | |
| 10,365,531 B2 | 7/2019 | Shrivastava et al. | |
| 10,488,837 B2 | 11/2019 | Cirino | |
| 10,724,867 B1 | 7/2020 | Waful et al. | |
| 10,867,266 B1 | 12/2020 | Carlin et al. | |
| 10,917,259 B1 | 2/2021 | Chein et al. | |
| 10,921,675 B2 | 2/2021 | Barnum et al. | |
| 10,923,226 B2 | 2/2021 | Macary et al. | |
| 10,935,864 B2 | 3/2021 | Shrivastava et al. | |
| 10,936,299 B2* | 3/2021 | Butcher | G06F 8/654 |
| 10,954,677 B1 | 3/2021 | Scanlin | |
| 10,982,487 B2 | 4/2021 | Ramirez | |
| 10,989,976 B2 | 4/2021 | Shrivastava et al. | |
| 11,137,659 B2 | 10/2021 | Shrivastava et al. | |
| 11,255,120 B2 | 2/2022 | Shrivastava et al. | |
| 11,269,619 B2* | 3/2022 | Rouland | H04L 9/3236 |
| 11,405,465 B2 | 8/2022 | Shrivastava et al. | |
| 11,631,493 B2 | 4/2023 | Schlameuss et al. | |
| 11,668,992 B2 | 6/2023 | Shrivastava et al. | |
| 11,681,197 B2 | 6/2023 | Shrivastava et al. | |
| 2001/0042976 A1 | 11/2001 | Breed et al. | |
| 2002/0072868 A1 | 6/2002 | Bartone et al. | |
| 2002/0113168 A1 | 8/2002 | Rukavina et al. | |
| 2002/0152298 A1 | 10/2002 | Kikta et al. | |
| 2003/0007462 A1 | 1/2003 | Makinen et al. | |
| 2003/0039257 A1 | 2/2003 | Manis et al. | |
| 2003/0163351 A1 | 8/2003 | Brown et al. | |
| 2003/0210450 A1 | 11/2003 | Yu et al. | |
| 2003/0227663 A1 | 12/2003 | Agrawal et al. | |
| 2005/0002662 A1 | 1/2005 | Arpa et al. | |
| 2005/0046584 A1 | 3/2005 | Breed | |
| 2005/0063036 A1 | 3/2005 | Bechtel et al. | |
| 2005/0157675 A1 | 7/2005 | Feder et al. | |
| 2005/0193160 A1 | 9/2005 | Bhatt et al. | |
| 2005/0200937 A1 | 9/2005 | Weidner | |
| 2005/0213992 A1 | 9/2005 | Piehler | |
| 2006/0001683 A1 | 1/2006 | May et al. | |
| 2006/0074494 A1 | 4/2006 | McFarland | |
| 2006/0145833 A1 | 7/2006 | Brandt et al. | |
| 2006/0270440 A1 | 11/2006 | Shearer et al. | |
| 2007/0053053 A1 | 3/2007 | Moskowitz | |
| 2007/0067048 A1 | 3/2007 | Bechtel et al. | |
| 2007/0097484 A1 | 5/2007 | Libretto et al. | |
| 2007/0109989 A1 | 5/2007 | Nakagawa et al. | |
| 2007/0191074 A1 | 8/2007 | Harrist et al. | |
| 2007/0222542 A1 | 9/2007 | Joannopoulos et al. | |
| 2008/0018979 A1 | 1/2008 | Mahe et al. | |
| 2008/0052702 A1* | 2/2008 | Chuang | G06F 8/65 717/170 |
| 2008/0182506 A1 | 7/2008 | Jackson et al. | |
| 2008/0184350 A1 | 7/2008 | Chu | |
| 2008/0277486 A1 | 11/2008 | Seem et al. | |
| 2009/0210252 A1 | 8/2009 | Silver | |
| 2009/0231662 A1 | 9/2009 | Sorensson et al. | |
| 2009/0257576 A1 | 10/2009 | Wellard et al. | |
| 2009/0319807 A1 | 12/2009 | Chasen et al. | |
| 2009/0322347 A1 | 12/2009 | Hashimshony et al. | |
| 2010/0066484 A1 | 3/2010 | Hanwright et al. | |
| 2010/0172009 A1 | 7/2010 | Matthews | |
| 2010/0188057 A1 | 7/2010 | Tarng | |
| 2010/0243427 A1 | 9/2010 | Kozlowski et al. | |
| 2010/0245973 A1 | 9/2010 | Wang et al. | |
| 2010/0274366 A1 | 10/2010 | Fata et al. | |
| 2010/0315693 A1 | 12/2010 | Lam et al. | |
| 2011/0050756 A1 | 3/2011 | Cassidy et al. | |
| 2011/0124313 A1 | 5/2011 | Jones | |
| 2011/0148218 A1 | 6/2011 | Rozbicki | |
| 2011/0154022 A1 | 6/2011 | Cheng et al. | |
| 2011/0184561 A1 | 7/2011 | Klasson et al. | |
| 2011/0223886 A1 | 9/2011 | Nasielski et al. | |
| 2011/0266137 A1 | 11/2011 | Wang et al. | |
| 2011/0266138 A1 | 11/2011 | Wang et al. | |
| 2011/0267674 A1 | 11/2011 | Wang et al. | |
| 2011/0267675 A1 | 11/2011 | Wang et al. | |
| 2011/0310519 A1 | 12/2011 | Baba et al. | |
| 2012/0032855 A1 | 2/2012 | Reede et al. | |
| 2012/0033287 A1 | 2/2012 | Friedman et al. | |
| 2012/0039526 A1 | 2/2012 | Garaas et al. | |
| 2012/0062975 A1 | 3/2012 | Mehtani et al. | |
| 2012/0112883 A1 | 5/2012 | Wallace et al. | |
| 2012/0133315 A1 | 5/2012 | Berman et al. | |
| 2012/0143516 A1 | 6/2012 | Mezic et al. | |
| 2012/0198435 A1* | 8/2012 | Dirstine | G06F 8/65 717/172 |
| 2012/0215874 A1 | 8/2012 | Sequeira et al. | |
| 2012/0232969 A1 | 9/2012 | Fadell et al. | |
| 2012/0239209 A1 | 9/2012 | Brown et al. | |
| 2012/0293855 A1 | 11/2012 | Shrivastava et al. | |
| 2012/0296610 A1 | 11/2012 | Hailemariam et al. | |
| 2013/0054033 A1 | 2/2013 | Casilli | |
| 2013/0057937 A1 | 3/2013 | Berman et al. | |
| 2013/0073681 A1 | 3/2013 | Jiang et al. | |
| 2013/0085614 A1 | 4/2013 | Wenzel et al. | |
| 2013/0130227 A1 | 5/2013 | Peltz et al. | |
| 2013/0157493 A1 | 6/2013 | Brown | |
| 2013/0226353 A1 | 8/2013 | Park | |
| 2013/0250422 A1 | 9/2013 | Tandler | |
| 2013/0271812 A1 | 10/2013 | Brown et al. | |
| 2013/0271814 A1 | 10/2013 | Brown | |
| 2013/0271815 A1 | 10/2013 | Pradhan et al. | |
| 2013/0277539 A1 | 10/2013 | Smilansky et al. | |
| 2014/0007244 A1 | 1/2014 | Martin et al. | |
| 2014/0028551 A1 | 1/2014 | Ruff et al. | |
| 2014/0058567 A1* | 2/2014 | Matsuoka | G05B 15/02 700/276 |
| 2014/0101573 A1 | 4/2014 | Kuo | |

(56) References Cited

U.S. PATENT DOCUMENTS

| | | |
|---|---|---|
| 2014/0108647 A1 | 4/2014 | Bleess et al. |
| 2014/0236323 A1 | 8/2014 | Brown et al. |
| 2014/0247475 A1 | 9/2014 | Parker et al. |
| 2014/0300945 A1* | 10/2014 | Parker |
| 2014/0317514 A1 | 10/2014 | Bokotey |
| 2014/0368899 A1 | 12/2014 | Greer |
| 2015/0002919 A1 | 1/2015 | Jack et al. |
| 2015/0032264 A1 | 1/2015 | Emmons et al. |
| 2015/0070745 A1 | 3/2015 | Pradhan |
| 2015/0103389 A1 | 4/2015 | Klawuhn et al. |
| 2015/0106121 A1 | 4/2015 | Muhsin et al. |
| 2015/0116811 A1 | 4/2015 | Shrivastava et al. |
| 2015/0122474 A1 | 5/2015 | Petersen |
| 2015/0160965 A1 | 6/2015 | Archer et al. |
| 2015/0195644 A1 | 7/2015 | Wilson et al. |
| 2015/0255651 A1 | 9/2015 | Barr et al. |
| 2015/0270823 A1 | 9/2015 | Sobolewski |
| 2015/0323915 A1 | 11/2015 | Warren et al. |
| 2015/0327010 A1 | 11/2015 | Gottschalk et al. |
| 2015/0362819 A1 | 12/2015 | Bjornard et al. |
| 2015/0378715 A1 | 12/2015 | Solnit et al. |
| 2016/0027391 A1 | 1/2016 | Gibson et al. |
| 2016/0052446 A1 | 2/2016 | Frey et al. |
| 2016/0054633 A1 | 2/2016 | Brown et al. |
| 2016/0071183 A1 | 3/2016 | Joshi et al. |
| 2016/0091769 A1 | 3/2016 | Rozbicki |
| 2016/0134932 A1 | 5/2016 | Karp et al. |
| 2016/0154290 A1 | 6/2016 | Brown et al. |
| 2016/0210711 A1 | 7/2016 | Krupa et al. |
| 2016/0231755 A1 | 8/2016 | Ajax et al. |
| 2016/0261837 A1 | 9/2016 | Thompson et al. |
| 2016/0299210 A1 | 10/2016 | Zeine |
| 2016/0359965 A1 | 12/2016 | Murphy et al. |
| 2016/0376831 A1 | 12/2016 | Plummer |
| 2016/0377948 A1 | 12/2016 | Rozbicki et al. |
| 2017/0010880 A1* | 1/2017 | Yamazaki ............... G06F 8/656 |
| 2017/0039339 A1 | 2/2017 | Bitran et al. |
| 2017/0070457 A1 | 3/2017 | Sachs |
| 2017/0075183 A1 | 3/2017 | Brown |
| 2017/0080341 A1 | 3/2017 | Mao et al. |
| 2017/0082903 A1 | 3/2017 | Vigano et al. |
| 2017/0085834 A1 | 3/2017 | Kim et al. |
| 2017/0086003 A1 | 3/2017 | Rabinowitz et al. |
| 2017/0097553 A1 | 4/2017 | Jack et al. |
| 2017/0122802 A1 | 5/2017 | Brown et al. |
| 2017/0146884 A1 | 5/2017 | Vigano et al. |
| 2017/0161911 A1 | 6/2017 | Kumar et al. |
| 2017/0242686 A1* | 8/2017 | Vidyadhara ............. G06F 8/656 |
| 2017/0248564 A1 | 8/2017 | Miyajima |
| 2017/0264865 A1 | 9/2017 | Huangfu |
| 2017/0272317 A1 | 9/2017 | Singla et al. |
| 2017/0276542 A1 | 9/2017 | Klawuhn et al. |
| 2017/0345267 A1 | 11/2017 | Flint et al. |
| 2017/0364046 A1 | 12/2017 | Westrick, Jr. et al. |
| 2017/0374255 A1 | 12/2017 | Campbell et al. |
| 2017/0374437 A1 | 12/2017 | Schwarzkopf et al. |
| 2018/0088432 A1 | 3/2018 | Shrivastava et al. |
| 2018/0090992 A1 | 3/2018 | Shrivastava et al. |
| 2018/0119973 A1 | 5/2018 | Rothman et al. |
| 2018/0129172 A1 | 5/2018 | Shrivastava et al. |
| 2018/0130455 A1 | 5/2018 | Plummer et al. |
| 2018/0139517 A1 | 5/2018 | Schwartz et al. |
| 2018/0144696 A1 | 5/2018 | Zhang et al. |
| 2018/0153454 A1 | 6/2018 | Hayter et al. |
| 2018/0156484 A1 | 6/2018 | Kim et al. |
| 2018/0181085 A1 | 6/2018 | Gabriel et al. |
| 2018/0187484 A1 | 7/2018 | Hebeisen et al. |
| 2018/0195752 A1 | 7/2018 | Sasaki et al. |
| 2018/0225585 A1 | 8/2018 | Dong et al. |
| 2018/0259373 A1 | 9/2018 | Staton et al. |
| 2018/0269974 A1 | 9/2018 | Luciano |
| 2018/0287780 A1 | 10/2018 | Safford et al. |
| 2018/0306609 A1 | 10/2018 | Agarwal et al. |
| 2018/0307114 A1 | 10/2018 | Brown et al. |
| 2018/0314511 A1* | 11/2018 | Butcher .................. G06F 8/654 |
| 2018/0321042 A1 | 11/2018 | Brewer et al. |
| 2018/0349710 A1 | 12/2018 | Houri et al. |
| 2018/0364654 A1 | 12/2018 | Locke et al. |
| 2019/0025661 A9 | 1/2019 | Brown et al. |
| 2019/0049811 A9 | 2/2019 | Shrivastava et al. |
| 2019/0049812 A1 | 2/2019 | Brown |
| 2019/0058977 A1 | 2/2019 | Gherardi et al. |
| 2019/0097827 A1 | 3/2019 | Angle et al. |
| 2019/0178511 A1 | 6/2019 | Zimmerman et al. |
| 2019/0205774 A1 | 7/2019 | Ba et al. |
| 2019/0229768 A1 | 7/2019 | Jeremy et al. |
| 2019/0257143 A1 | 8/2019 | Nagel et al. |
| 2019/0294018 A1 | 9/2019 | Shrivastava et al. |
| 2019/0317458 A1 | 10/2019 | Shrivastava et al. |
| 2019/0320033 A1 | 10/2019 | Nagata et al. |
| 2019/0324431 A1 | 10/2019 | Cella et al. |
| 2019/0354071 A1 | 11/2019 | Turney et al. |
| 2019/0356508 A1 | 11/2019 | Trikha et al. |
| 2019/0361411 A1 | 11/2019 | Park et al. |
| 2020/0019622 A1 | 1/2020 | Lu et al. |
| 2020/0026141 A1 | 1/2020 | Brown et al. |
| 2020/0041967 A1 | 2/2020 | Shrivastava et al. |
| 2020/0045261 A1 | 2/2020 | Lim et al. |
| 2020/0067865 A1 | 2/2020 | Jiménez et al. |
| 2020/0080364 A1 | 3/2020 | Shrivastava et al. |
| 2020/0090089 A1 | 3/2020 | Aston et al. |
| 2020/0096775 A1 | 3/2020 | Franklin et al. |
| 2020/0103841 A1 | 4/2020 | Pillai et al. |
| 2020/0162856 A1 | 5/2020 | Ziv et al. |
| 2020/0176125 A1 | 6/2020 | Chatterjea et al. |
| 2020/0193155 A1 | 6/2020 | Keohane et al. |
| 2020/0227159 A1 | 7/2020 | Boisvert et al. |
| 2020/0241379 A1 | 7/2020 | Barnum et al. |
| 2020/0257179 A1 | 8/2020 | Barnum et al. |
| 2020/0310213 A1 | 10/2020 | Shrivastava et al. |
| 2021/0021788 A1 | 1/2021 | Mcnelley et al. |
| 2021/0116769 A1 | 4/2021 | Shrivastava et al. |
| 2021/0191221 A1 | 6/2021 | Shrivastava et al. |
| 2021/0208467 A1 | 7/2021 | Shrivastava et al. |
| 2021/0210053 A1 | 7/2021 | Ng et al. |
| 2021/0373402 A1 | 12/2021 | Shrivastava et al. |
| 2021/0375440 A1 | 12/2021 | Schlameuss et al. |
| 2021/0383804 A1 | 12/2021 | Makker et al. |
| 2021/0390953 A1 | 12/2021 | Makker et al. |
| 2022/0136319 A1 | 5/2022 | Shrivastava et al. |
| 2022/0159077 A1 | 5/2022 | Shrivastava et al. |
| 2022/0214652 A1 | 7/2022 | Trikha et al. |
| 2022/0231396 A1 | 7/2022 | Rozbicki et al. |
| 2022/0337596 A1 | 10/2022 | Smith et al. |
| 2023/0040424 A1 | 2/2023 | Gopinathanasari et al. |
| 2023/0041490 A1 | 2/2023 | Vangati et al. |
| 2023/0065864 A1 | 3/2023 | Trikha et al. |
| 2023/0074720 A1 | 3/2023 | Brown et al. |
| 2023/0113718 A1 | 4/2023 | Khanna et al. |
| 2023/0120049 A1 | 4/2023 | Vangati et al. |
| 2023/0152652 A1 | 5/2023 | Trikha et al. |
| 2023/0176669 A1 | 6/2023 | Gupta et al. |
| 2023/0194115 A1 | 6/2023 | Malik et al. |
| 2023/0230686 A1 | 7/2023 | Schlameuss et al. |

FOREIGN PATENT DOCUMENTS

| | | |
|---|---|---|
| CN | 101013211 A | 8/2007 |
| CN | 101023711 A | 8/2007 |
| CN | 101213788 A | 7/2008 |
| CN | 103119845 A | 5/2013 |
| CN | 203019761 U | 6/2013 |
| CN | 103649826 A | 3/2014 |
| CN | 104335595 A | 2/2015 |
| CN | 105143586 A | 12/2015 |
| CN | 106125442 A | 11/2016 |
| CN | 106837094 A | 6/2017 |
| CN | 108769186 A | 11/2018 |
| CN | 110515425 A | 11/2019 |
| EP | 0917667 A1 | 5/1999 |
| EP | 0920210 A1 | 6/1999 |
| EP | 0676058 B1 | 4/2003 |
| EP | 1929701 A2 | 6/2008 |
| EP | 2090961 A1 | 8/2009 |

(56) References Cited

FOREIGN PATENT DOCUMENTS

| | | |
|---|---|---|
| EP | 2267966 A2 | 12/2010 |
| EP | 3299957 A1 | 3/2018 |
| EP | 3328000 A1 | 5/2018 |
| JP | H0611477 A | 1/1994 |
| JP | H06308073 A | 11/1994 |
| JP | 2004505298 A | 2/2004 |
| JP | 2005115409 A | 4/2005 |
| JP | 4139109 B2 | 8/2008 |
| JP | 2019186771 A | 10/2019 |
| KR | 20120092921 A | 8/2012 |
| KR | 20170121858 A | 11/2017 |
| KR | 20170134321 A | 12/2017 |
| KR | 20180012615 A | 2/2018 |
| KR | 101853568 B1 | 4/2018 |
| KR | 20210032133 A | 3/2021 |
| KR | 20210039721 A | 4/2021 |
| RU | 2378672 C2 | 1/2010 |
| RU | 2009132962 A | 3/2011 |
| TW | 201115503 A | 5/2011 |
| TW | 201351010 A | 12/2013 |
| TW | 201606409 A | 2/2016 |
| TW | 201631551 A | 9/2016 |
| TW | I607269 B | 12/2017 |
| WO | WO-0065770 A1 | 11/2000 |
| WO | WO-0209338 A2 | 1/2002 |
| WO | WO-0213052 A2 | 2/2002 |
| WO | WO-02054086 A1 | 7/2002 |
| WO | WO-2007029215 A2 | 3/2007 |
| WO | WO-2008122906 A1 | 10/2008 |
| WO | WO-2009042359 A1 | 4/2009 |
| WO | WO-2010120771 A1 | 10/2010 |
| WO | WO-2012101878 A1 | 8/2012 |
| WO | WO-2013090264 A1 | 6/2013 |
| WO | WO-2013121103 A1 | 8/2013 |
| WO | WO-2013155467 A1 | 10/2013 |
| WO | WO-2014032023 A1 | 2/2014 |
| WO | WO-2014209812 A1 | 12/2014 |
| WO | WO-2015100419 A1 | 7/2015 |
| WO | WO-2015113592 A1 | 8/2015 |
| WO | WO-2015134789 A1 | 9/2015 |
| WO | WO-2015168626 A1 | 11/2015 |
| WO | WO-2015171886 A1 | 11/2015 |
| WO | WO-2016004109 A1 | 1/2016 |
| WO | WO-2016054112 A1 | 4/2016 |
| WO | WO-2016072620 A1 | 5/2016 |
| WO | WO-2016085964 A1 | 6/2016 |
| WO | WO-2016094445 A1 | 6/2016 |
| WO | WO-2016107285 A1 | 7/2016 |
| WO | WO-2017007841 A1 | 1/2017 |
| WO | WO-2017058568 A1 | 4/2017 |
| WO | WO-2017059362 A1 | 4/2017 |
| WO | WO-2017075059 A1 | 5/2017 |
| WO | WO-2017075472 A1 | 5/2017 |
| WO | WO-2017120262 A1 | 7/2017 |
| WO | WO-2017155833 A1 | 9/2017 |
| WO | WO-2017189618 A1 | 11/2017 |
| WO | WO-2017192881 A1 | 11/2017 |
| WO | WO-2018039080 A1 | 3/2018 |
| WO | WO-2018063919 A1 | 4/2018 |
| WO | WO-2018098089 A1 | 5/2018 |
| WO | WO-2018102103 A1 | 6/2018 |
| WO | WO-2018200702 A1 | 11/2018 |
| WO | WO-2018200740 A2 | 11/2018 |
| WO | WO-2018200752 A1 | 11/2018 |
| WO | WO-2019178282 A1 | 9/2019 |
| WO | WO-2019213441 A1 | 11/2019 |
| WO | WO-2020243690 A1 | 12/2020 |
| WO | WO-2021211798 A1 | 10/2021 |

OTHER PUBLICATIONS

Chen, Daming D., et al. "Towards automated dynamic analysis for linux-based embedded firmware." NDSS. vol. 1. 2016. pp. 1-16 (Year: 2016).*

Sivanathan, Arunan, Hassan Habibi Gharakheili, and Vijay Sivaraman. "Detecting behavioral change of IoT devices using clustering-based network traffic modeling." IEEE Internet of Things Journal 7.8 (2020): pp. 7295-7309. (Year: 2020).*

Cui, Ang, Michael Costello, and Salvatore Stolfo. "When firmware modifications attack: A case study of embedded exploitation." (2013). pp. 1-13. (Year: 2013).*

Srivastava, Prashast, et al. "Firmfuzz: Automated iot firmware introspection and analysis." Proceedings of the 2nd International ACM Workshop on Security and Privacy for the Internet-of-Things. 2019. pp. 15-21. (Year: 2019).*

Liu, Muqing, et al. "Security analysis of vendor customized code in firmware of embedded device." International Conference on Security and PRivacy in Communication Systems. Cham: Springer International Publishing, 2016. pp. 722-739. (Year: 2016).*

Aamidor, J., "Blockchain: coming to a smart building near you?", GreenTechMedia.com, Sep. 19, 2017, 5 pp. https://www.greentechmedia.com/articles/read/blockchain-coming-to-a-smart-building-near-you#gs.0jk23x retrieved Jan. 25, 2021.

Alarifi, A. et al., "Ultra Wideband Indoor Positioning Technologies: Analysis and Recent Advances", Sensors, May 16, 2016, vol. 16 No. 5, pp. 1-36.

AU Office action dated Dec. 5, 2022, in AU Application No. AU2017363581.

"Blockchain and the internet of things: the IoT blockchain opportunity and challenge," I-Scoop, Sep. 2016, rev. Feb. 2018, 16 pp. https://www.i-scoop.eu/blockchain-distributed-ledger-technology/blockchain-iot/ retrieved Feb. 20, 2019.

CA Office Action dated Apr. 4, 2023, in Application No. CA3017138.

Chan, E.C.L, et al., "Effect of Channel Interference on Indoor Wireless Local Area Network Positioning" IEEE 6th International Conference on Wireless and Mobile Computing, Networking and Communications, Oct. 11, 2010, pp. 239-245.

Chinese Office Action dated Jan. 15, 2018 in CN Application No. 201380025802.1.

Chinese Office Action dated Jan. 4, 2021 in CN Application No. 201780079165.4.

Chinese Office Action dated Jun. 21, 2017 in CN Application No. 201380025802.1.

Chinese Office Action dated Jun. 3, 2021 in CN Application No. 201780079165.4.

Chinese Office Action dated May 20, 2020 in CN Application No. 201810932986.4.

Chinese Office Action dated May 26, 2020 in CN Application No. 201780079165.4.

Chinese Office Action dated Nov. 23, 2020 in CN Application No. 201810932986.4.

CN Office Action dated Jan. 13, 2021 in CN Application No. 201780082949.2.

CN Office Action dated Jul. 21, 2021 in CN Application No. 201780082949.2.

CN Office Action dated Mar. 2, 2022 in Application No. CN201980042340.1 with English translation.

CN Office Action dated May 26, 2020 in CN Application No. 201780082949.2.

CN Office Action dated Nov. 2, 2022, in ApplicationNo. CN201980042340.1 with English translation.

Dang, T. et al., "An Approach to Data Privacy in Smart Home using Blockchain Technology", International Conference on Advanced Computing and Applications, IEEE, Nov. 27, 2018, pp. 58-64.

Density DPU Technical Specifications v1.0, Density, 2018, downloaded from www.density.io.

Dols, W. Stuart, et al., A tool to model the fate and transport of indoor microbiological aerosols (FaTIMA), NIST Technical Note 2095, National Institute of Standards and Technology, US Department of Commerce, Jun. 2020, 32 pp. https://doi.org/10.6028/NIST.TN.2095.

EP Extended European search report dated Oct. 13, 2022, in Application No. EP22182320.6.

EP Office Action dated Apr. 13, 2022, in Application No. EP17874769.7.

EP Office action dated Jan. 10, 2022, in Application No. EP19745809.4.

(56) References Cited

OTHER PUBLICATIONS

EP Office action dated May 16, 2023, in Application No. EP19745809.4.
EP Office Action dated May 20, 2022, in Application No. EP20170880595.8.
EP Office Action dated Oct. 5, 2021, in application No. EP17874769.7.
European (Extended) Search Report dated Aug. 25, 2017 in European Application No. 17156033.7.
European (extended) Search Report dated Dec. 4, 2015 in European Application No. 13775052.7.
European (extended) Search Report dated Nov. 28, 2019 in European Application No. 17763804.6.
Extended European Search Report dated Nov. 2, 2020 in EP Application No. 17880595.8.
"Halio Rooftop Sensor Kit (Model SR500)," Product Data Sheet, Kinestral Technologies, 2020, 4 pp.
IN First Examination Report dated Sep. 17, 2021, in Application No. IN202038045168.
Indian Office Action dated Jul. 6, 2022, in IN Application No. 201917018642.
Indian Office Action dated Sep. 17, 2019 in Indian Application No. 2533/KOLNP/2014.
International Preliminary Report on Patentability and written opinion dated Jul. 21, 2022 in Application PCT/US2021/012313.
International Preliminary Report on Patentability dated Oct. 6, 2022 in PCT Application PCT/US2021/023433.
International Preliminary Report on Patentability dated Oct. 6, 2022 in PCT Application PCT/US2021/023834.
International Search Report and Written Opinion dated Aug. 2, 2022 in Application No. PCT/US2022/030757.
International Search Report and Written Opinion dated Aug. 22, 2022 in Application No. PCT/US2022/024343.
International Search Report and Written Opinion dated Mar. 25, 2022 in Application No. PCT/US2021/062774.
International Search Report and Written Opinion dated Sep. 26, 2022 in Application No. PCT/US2022/0329930.
International Preliminary Report on Patentability dated Aug. 11, 2022 in PCT Application No. PCT/US2021/015378.
International Preliminary Report on Patentability dated Aug. 25, 2022, in PCT Application No. PCT/US2021/017946.
International Preliminary Report on Patentability dated Dec. 1, 2022, in PCT Application No. PCT/US2021/033544.
International Preliminary Report on Patentability dated Dec. 9, 2021, in PCT Application No. PCT/US2020/035485.
International Preliminary Report on Patentability dated Dec. 16, 2021, for International Application No. PCT/US2020/070123.
International Preliminary Report on Patentability dated Dec. 22, 2020 in PCT/US2019/038429.
International Preliminary Report on Patentability dated Feb. 9, 2023 in PCT Application No. PCT/US2021/043143.
International Preliminary Report on Patentability dated Jun. 22, 2023, in Application No. PCT/US2021/062774.
International Preliminary Report on Patentability dated Jun. 27, 2019 for PCT/US2017/066486.
International Preliminary Report on Patentability dated Mar. 9, 2023 in PCT Application No. PCT/US2021/046838.
International Preliminary Report on Patentability dated Oct. 23, 2014 issued in PCT/US2013/036456.
International Preliminary Report on Patentability dated Sep. 20, 2018, issued in PCT/US17/20805.
International Preliminary Report on Patentability dated Sep. 22, 2022, in PCT Application No. PCT/US2021/021833.
International Preliminary Reporton Patentability dated Apr. 13, 2023 in PCT Application No. No. PCT/US2021/052587.
International Search Report and Written Opinion dated Apr. 13, 2018 for PCT/US2017/066486.
International Search Report and Written Opinion dated Aug. 8, 2022, in Application No. PCT/US2022/023605.
International Search Report and Written Opinion dated Jan. 17, 2022 in PCT Application No. PCT/US2021/046838.
International Search Report and Written Opinion dated Jul. 6, 2022, in PCT Application No. PCT/US2022/020730.
International Search Report and Written Opinion dated Jul. 1, 2021 in PCT/US2021/021833.
International Search Report and Written Opinion dated Jul. 26, 2013, issued in PCT/US2013/036456.
International Search Report and Written Opinion dated Jun. 23, 2021 in PCT Application No. PCT/US2021/015378.
International Search Report and Written Opinion dated Jun. 5, 2017, issued in PCT/US17/20805.
International Search Report and Written Opinion dated Mar. 8, 2022 in PCT Application No. PCT/US2021/052587.
International Search Report and Written Opinion dated Nov. 10, 2021 in PCT Application No. PCT/US2021/043143.
International Search Report and Written Opinion dated Nov. 23, 2020 in PCT/US2020/070123.
International Search Report and Written Opinion dated Sep. 1, 2022, in Application No. PCT/US2022/024812.
International Search Report and Written Opinion dated Sep. 1, 2022 in Application No. PCT/US2022/028850.
International Search Report and Written Opinion dated Sep. 3, 2021 in PCT Application No. PCT/US2021/033544.
International Search Report and Written Opinion dated Sep. 16, 2019 in PCT/US2019/038429.
International Search Report and Written Opinion (ISA/EP) dated Sep. 30, 2020 in PCT Application No. PCT/US2020/035485.
Invitation to Pay Additional Fees dated Sep. 14, 2020 in PCT/US2020/070123.
Japanese Decision to Grant (w/cited references) dated Aug. 3, 2021 in JP Application No. 2019-526561.
Joseph, J., "Xiaomi shows off near perfect Under Screen Camera Technology," Gizchina.com, Aug. 28, 2020, 7 pp., "title="Link: https://www.gizmochina.com/2020/08/28/xiaomi-perfected-third-gen-under-screen-camera-technology-prototype/>">https://www.gizmochina.com/2020/08/28/xiaomi-perfected-third-gen-under-screen-camera-technology-prototype/ , retrieved Apr. 21, 2021.
JP Office Action dated Dec. 20, 2022 in JP Application No. JP2020-570981 with English translation.
KR Office Action dated Dec. 7, 2022 in Application No. KR10-2022-7036992 with English translation.
Notice of Allowance dated Oct. 29, 2021 in U.S. Appl. No. 16/469,848.
PCT Application No. PCT/US2021/012313 filed Jan. 6, 2021.
PCT Application No. PCT/US2021/015378 filed Jan. 28, 2021.
PCT Application No. PCT/US2021/021833 filed Mar. 11, 2021.
PCT Application No. PCT/US2021/023433 filed Mar. 23, 2021.
PCT Application No. PCT/US2021/030798 filed May 5, 2021.
PCT Application No. PCT/US2021/052587 filed Sep. 29, 2021.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
Rajiv, "How does Cloud Radio Access Network (C-RAN) works," RF Page, Apr. 16, 2018, 5 pp. https://www.rfpage.com/how-cloud-radio-access-network-works/ Accessed May 19, 2021.
"Remote Radio Head for CPRI and 4G, 5G & LTE Networks," CableFree by Wireless Excellence Limited, 2020, 8 pp., https://www.cablefree.net/wirelesstechnology/4glte/remote-radio-head/ Accessed May 19, 2021.
Russian Office Action dated Mar. 9, 2017 in RU Application No. 2014145565.
Taiwanese Office Action dated Apr. 16, 2021 in TW Application No. 106140690.
Taiwanese Office Action dated Nov. 23, 2020 in TW Application No. 106107498.
TW Office Action dated Feb. 16, 2023, in Application No. TW108121734 with English translation.
TW Office Action dated Feb. 17, 2022, in Application No. TW110135156 with English translation.
TW Office Action dated Jul. 14, 2022, in Application No. TW108121734 with English translation.

(56) References Cited

OTHER PUBLICATIONS

TW Office Action dated Mar. 15, 2022, in Application No. TW109112242 with Englishtranslation.
TW Office Action dated Oct. 26, 2021, in application No. 106144418 with English translation.
U.S Advisory Action dated Aug. 31, 2022 in U.S. Appl. No. 16/447,169.
U.S. Non-Final office Action dated Sep. 21, 2022 in U.S. Appl. No. 17/211,697.
U.S. Advisory Action dated Apr. 29, 2022 in U.S. Appl. No. 17/328,346.
U.S. Advisory Action dated Dec. 15, 2021 in U.S. Appl. No. 16/447,169.
U.S Advisory Action dated Jan. 22, 2023 in U.S. Appl. No. 16/550,052.
U.S Advisory Action dated Mar. 20, 2023 in U.S. Appl. No. 17/247,662.
U.S. Appl. No. 62/958,653, inventors Gopinathanasari et al., filed on Jan. 8, 2020.
U.S. Appl. No. 62/988,861, inventors Khanna et al., filed on Mar. 12, 2020.
U.S. Appl. No. 62/993,617, inventors Gupta et al., filed on Mar. 23, 2020.
U.S. Appl. No. 63/000,342, inventors Larson, filed on Mar. 26, 2020.
U.S. Appl. No. 63/020,819, inventors Gupta et al., filed on May 6, 2020.
U.S. Appl. No. 63/029,301, inventors Gupta et al., filed on May 22, 2020.
U.S. Appl. No. 63/033,474, inventors Gupta et al., filed on Jun. 2, 2020.
U.S. Appl. No. 63/034,792, inventors Gupta et al., filed on Jun. 4, 2020.
U.S. Appl. No. 63/041,002, inventors Gupta et al., filed on Jun. 18, 2020.
U.S. Appl. No. 63/057,120, Inventors Gupta et al., filed on Jul. 27, 2020
U.S. Appl. No. 63/069,358, inventors Gupta et al., filed on Aug. 24, 2020.
U.S. Appl. No. 63/078,805, Inventors Gupta et al., filed on Sep. 15, 2020.
U.S. Appl. No. 63/079,851, inventors Gupta et al., filed on Sep. 17, 2020.
U.S. Appl. No. 63/106,058, inventors Rasmus-Vorrath et al., filed on Oct. 27, 2020.
U.S. Appl. No. 63/115,886, Inventors Gupta et al., filed on Nov. 19, 2020.
U.S. Appl. No. 63/121,561, inventors Larson et al., filed on Dec. 4, 2020.
U.S. Appl. No. 63/133,725, inventors Gopinathanasari et al., filed on Jan. 4, 2021.
U.S. Appl. No. 63/159,814, Inventors Gupta et al., filed on Mar. 11, 2021.
U.S. Appl. No. 63/173,759, inventors Rasmus-Vorrath et al., filed on Apr. 12, 2021.
U.S. Appl. No. 63/209,362, Inventors Gomez-Martinez et al., filed on Jun. 10, 2021.
U.S. Appl. No. 63/233,122, inventors Gupta et al., filed on Aug. 13, 2021.
U.S Corrected Notice of Allowability dated Sep. 1, 2021 in U.S. Appl. No. 16/298,776.
U.S. Corrected Notice of Allowance dated May 19, 2022, in U.S. Appl. No. 16/438,177.
US Final Office Action dated Aug. 13, 2021 in U.S. Appl. No. 16/447,169.
U.S. Final office Action dated Dec. 1, 2021 in U.S. Appl. No. 17/328,346.
U.S. Final Office Action dated Dec. 2, 2022 in U.S. Appl. No. 16/550,052.
U.S. Final Office Action dated Dec. 6, 2022 in U.S. Appl. No. 17/247,662.
US Final Office Action dated Feb. 5, 2020 in U.S. Appl. No. 15/727,258.
US Final Office Action dated Feb. 8, 2018 in U.S. Appl. No. 14/391,122.
US Final Office Action dated Jan. 1, 2021 in U.S. Appl. No. 16/550,052.
US Final Office Action dated Jul. 3, 2017 in U.S. Appl. No. 14/391,122.
U.S. Final Office Action dated Jun. 24, 2022, in U.S. Appl. No. 16/447,169.
US Final Office Action dated Nov. 20, 2018 in U.S. Appl. No. 14/391,122.
US Final Office Action dated Oct. 28, 2021 in U.S. Appl. No. 16/550,052.
U.S. Non Final office Action dated Sep. 2, 2021 in U.S. Appl. No. 17/328,346.
U.S. Non-Final office Action dated Jul. 22, 2022 in U.S. Appl. No. 17/328,346.
U.S. Non-Final office Action dated Nov. 15, 2022 in U.S. Appl. No. 16/447,169.
U.S. Non-Final office Action dated Sep. 9, 2022 in U.S. Appl. No. 17/249,442.
U.S. Non-Final Office Action dated Apr. 25, 2023 in U.S. Appl. No. 16/550,052.
U.S. Non-Final Office Action dated Jun. 1, 2023 in U.S. Appl. No. 17/247,662.
U.S. Non-Final office Action dated Mar. 9, 2023 in U.S. Appl. No. 17/909,925.
U.S. Non-Final Office Action dated Mar. 25, 2022, in U.S. Appl. No. 16/550,052.
U.S. Non-Final office Action dated Sep. 1, 2022 in U.S. Appl. No. 17/247,662.
US Non-final Rejection dated Oct. 26, 2021, in U.S. Appl. No. 16/438,177.
U.S. Notice of Allowance dated Jan. 9, 2023 in U.S. Appl. No. 17/328,346.
U.S. Notice of Allowance dated Apr. 12, 2023 in U.S. Appl. No. 16/447,169.
US Notice of Allowance dated Dec. 11, 2020 in U.S. Appl. No. 15/727,258.
U.S. Notice of Allowance dated Feb. 7, 2023 in U.S. Appl. No. 17/249,442.
U.S. Notice of Allowance dated Jan. 30, 2023 in U.S. Appl. No. 17/211,697.
U.S. Notice of Allowance dated Jul. 13, 2023 in U.S. Appl. No. 16/447,169.
U.S. Notice of Allowance dated Jul. 13, 2023 in U.S. Appl. No. 17/940,951.
U.S. Notice of Allowance dated Jun. 12, 2023, in U.S. Appl. No. 17/940,951.
US Notice of Allowance dated Mar. 11, 2019 in U.S. Appl. No. 14/391,122.
U.S. Notice of Allowance dated Mar. 31, 2023 in U.S. Appl. No. 17/249,442.
U.S. Notice of Allowance dated May 4, 2022 in U.S. Appl. No. 16/438,177.
US Notice of Allowance dated May 13, 2021in U.S. Appl. No. 16/462,916.
U.S. Notice of Allowance dated May 19, 2023 in U.S. Appl. No. 17/249,442.
U.S. Notice of Allowance dated Oct. 18, 2021, in U.S. Appl. No. 16/469,848.
US Notice of Allowance dated Sep. 30, 2020 in U.S. Appl. No. 16/082,793.
US Office Action dated Jan. 25, 2021 in U.S. Appl. No. 16/447,169.
US Office Action dated Jan. 7, 2021 in U.S. Appl. No. 16/469,848.
US Office Action dated Jun. 22, 2018 in U.S. Appl. No. 14/391,122.
US Office Action dated Jun. 5, 2020 in U.S. Appl. No. 15/727,258.
US Office Action dated May 5, 2021 in U.S. Appl. No. 16/550,052.
US Office Action dated Nov. 18, 2016 in U.S. Appl. No. 14/391,122.
US Office Action dated Oct. 11, 2019 in U.S. Appl. No. 15/727,258.

(56) References Cited

OTHER PUBLICATIONS

US Office Action dated Sep. 1, 2017 in U.S. Appl. No. 14/391,122.
US Office Action dated Sep. 18, 2020 in U.S. Appl. No. 16/550,052.
U.S. Appl. No. 62/102,515, inventors Nagar et al., filed on Jan. 12, 2015.
U.S. Appl. No. 62/102,516, inventors Nagar et al., filed on Jan. 12, 2015.
U.S. Appl. No. 63/124,673, inventors Tai et al., filed on Dec. 11, 2020.
U.S. Appl. No. 63/146,365, inventors Brown et al., filed on Feb. 5, 2021.
U.S. Appl. No. 63/163,305, inventors Trikha et al., filed on Mar. 19, 2021.
U.S. Appl. No. 63/171,871, inventors Gomez-Martinez et al., filed on Apr. 7, 2021.
U.S. Appl. No. 63/181,648, inventors Makker et al., filed on Apr. 29, 2021.
U.S. Appl. No. 63/187,632, inventors Hur et al., filed on May 12, 2021.
U.S. Appl. No. 63/226,127, inventors Lee et al., filed on Jul. 21, 2021.
U.S. Pat. Appl. No. PCT/US2021/017946, filed on Feb. 12, 2021.
U.S. Appl. No. 63/109,306, Inventors Marquez et al., filed on Nov. 3, 2020.
U.S. Appl. No. 63/212,483, inventors Martinson et al., filed on Jun. 18, 2021.
U.S. Appl. No. 63/246,770, Inventors Martinson et al., filed on Sep. 21, 2021.
U.S. Appl. No. 63/214,741, inventors Marquez et al., filed on Jun. 24, 2021.
U.S. Appl. No. 17/791,507, inventors Gopinathanasari et al., filed on Jul. 7, 2022.
U.S. Appl. No. 17/906,052, inventors Khanna et al., filed on Sep. 9, 2022.
U.S. Appl. No. 17/909,925, inventors Vangati et al., filed on Sep. 7, 2022.
U.S. Appl. No. 17/910,722, inventor Trikha et al., filed on Sep. 9, 2022.
U.S. Appl. No. 17/940,951, inventors Vangati et al., filed on Sep. 8, 2022.
U.S. Appl. No. 18/028,292, inventors Martinson et al., filed on Mar. 24, 2023.
U.S. Appl. No. 18/034,328, inventors Marquez et al., filed on Apr. 27, 2023.
U.S. Appl. No. 18/042,712, inventors Gupta et al., filed on Feb. 23, 2023.
U.S. Appl. No. 18/139,842, inventors Shrivastava D, et al., filed on Apr. 26, 2023.
U.S. Appl. No. 18/218,475, inventors Nitesh Trikha et al., filed on Jul. 5, 2023.
US Preliminary Amendment dated Jan. 23, 2020 in U.S. Appl. No. 16/469,848.
US Preliminary Amendment dated Apr. 6, 2020 in U.S. Appl. No. 16/550,052.
US Preliminary Amendment dated Nov. 13, 2019 in U.S. Appl. No. 16/447,169.
U.S. Restriction requirement dated May 4, 2023 in U.S. Appl. No. 17/400,596.
US Supplemental Notice of Allowance dated Feb. 5, 2021 in U.S. Appl. No. 16/082,793.

\* cited by examiner

COMPONENT UPDATES IN A MULTI COMPONENT NETWORK

BACKGROUND

An Application Data Sheet is filed concurrently with this specification as part of the present application. Each application that the present application claims benefit of or priority to as identified in the concurrently filed Application Data Sheet is incorporated herein by reference in its entirety and for all purposes. The ability to control environmental conditions is gaining increased popularity, as well as deployment and manipulation of related apparatuses such as sensors, emitters, and/or devices that affect the environment. Controlling the environment may be with the aim to increase occupant related advantage(s) (e.g., including comfort, health, productivity, and/or safety of occupant(s)), and/or to reduce power consumption and improving efficiency of systems controlling the environment of a facility (e.g., heater, cooler, vent, and/or lighting).

Included in these devices are tintable windows such as optically switchable windows. The development and deployment of devices including sensors and/or tintable windows for facilities (e.g., including buildings, rooms, or other enclosures) have increased as considerations of occupant related advantage(s), energy efficiency, and system integration gain momentum. Electrochromic windows are a promising class of optically switchable windows.

In an enclosure, a community of components (e.g., devices such as sensors, emitters, timing circuits, actuators, antennas, radars, transmitters, head ends, controllers, and/or receivers) may be placed at various locations of a facility, e.g., to analyze, detect, and/or react to various environmental attributes such as atmosphere, temperature, humidity, sound, electromagnetic waves, position, distance, movement, speed, vibration, volatile compounds (VOCs), dust, light, glare, color, gases (e.g., humidity, and/or carbon dioxide) and/or other aspects of the enclosure. Such components (e.g., devices) may be deployed in an ensemble having a common assembly (e.g., common housing or casing such as a box) containing a requested grouping of such components (e.g., modules). A component or collections of components, such as modules and/or components (e.g., sensors, emitters, and/or processing circuits), can be configured as a multiple component assembly (also referred to herein as "ensemble"). Depending on construction, the antenna element may be a Wi-Fi antenna, a Bluetooth antenna, a cellular communication antenna, etc. The antenna may be configured for at least a third generation (3G), fourth generation (4G), or fifth generation (5G) communication protocol. In some embodiments, the antenna transmits and/or receives in the radio frequency portion of the electromagnetic spectrum. The antenna may be a patch antenna, a monopole antenna, a dipole antenna, etc. It may be configured to transmit or receive electromagnetic signals in any appropriate wavelength range. Examples of antenna, its components, and its integration in the enclosure (e.g., building) and its components (e.g., optically switchable window) can be found in Patent Application Serial No. PCT/US17/31106, filed May 4, 2017, which was previously incorporated herein by reference in its entirety.

The components (e.g., devices) and/or ensembles may be included in a processing system having a plurality of nodes (e.g., components) linked together within a network. The processing system can be included in a control system. Some nodes (e.g., components) may include software and/or hardware that may be configured to operate various systems in one or more facilities (e.g., comprising an enclosure). A facility can include at least one building or any portion(s) of the building. The operating systems to be controlled can include tintable windows (e.g., having am insulated glass unit comprising an electrochromic device), building management systems, environmental sensors, and/or actuators (e.g., HVAC systems).

The component (e.g., device) and/or ensemble may comprise programmable circuitry (e.g., FPGA or PLD) and/or other circuitry utilizing updatable software (e.g., firmware), e.g., to perform according to requested operations and/or intended purpose. The nodes (e.g., components) of a facility that require update may be numerous, of different versions, of defend type, and/or reside in different ensembles in a facility. Updating of the individual and plurality of components (e.g., whether enclosed in an ensemble or not) that are coupled to a local (e.g., facility) network can be cumbersome, e.g., when these components and ensembles represent a sizable range of node types needing updates. An updating scheme becomes more cumbersome when some of the components require update and others do not, and/or when the updates vary among the components. An updating scheme that provides homogenous updates for all components provides an inadequate solution.

SUMMARY

Various aspects disclosed herein alleviate as least part of the above referenced shortcomings.

In some aspects, the invention provides an update scheme that (A) enables recognition of (i) at least one component among a plurality of components, (ii) its firmware and/or (iii) its software version, and (B) targets relevant updates to the at least one component that requires update. The update scheme may use mono or bidirectional communication between the at least one component and an update manager module (e.g., which module can reside in the cloud).

In another aspect, a method for automatically updating firmware of devices operatively coupled to a network, the method comprises: (A) matching (a) a firmware update among firmware updates for different devices with (b) a device of a device ensemble among a plurality of device ensembles, which device ensemble comprises the different devices, wherein the plurality of device ensembles is coupled to a network; and (B) updating the device with the firmware update, which updating is accomplished (i) without rebooting the device and/or (ii) during normal operation of the device.

In some embodiments, the device ensemble comprises: (1) a plurality of sensors or (II) a sensor and an emitter. In some embodiments, the different devices comprise at least two devices that differ in their device type. In some embodiments, the different devices comprise at least two devices that have the same device type. In some embodiments, the device ensemble is disposed in a fixture of a facility in which the plurality of device ensembles is disposed. In some embodiments, the method further comprises storing the firmware updates as images in an update manager, and wherein the device, the device ensemble, and/or the different devices, have bidirectional communication over the network with the update manager. In some embodiments, the firmware updates have been validated for the devices. In some embodiments, the update manager is included in a controller operatively coupled to the network, which controller is disposed in a facility in which the plurality of device ensembles is located. In some embodiments, the update manager is included in a controller disposed externally relative to the facility, and is coupled to the network by a cloud connection. In some embodiments, the method further comprises the update manager offering available one or more firmware updates to a user via a user interface. In some embodiments, the method further comprises selecting by a user a timing for distributing and/or installing the one or more firmware updates. In some embodiments, the one or more firmware updates are configured for one or more devices. In some embodiments, the one or more firmware updates are configured for the one or more devices. In some embodiments, the one or more firmware updates are configured for one or more devices respectively. In some embodiments, the method further comprises (1) recognizing the device and corresponding firmware version configured to execute on the device, and (2) targeting the device for updating by distributing firmware update to replace the version executing on the device. In some embodiments, recognizing the device is adapted according to the devices in a facility in which the plurality of device ensembles is disposed. In some embodiments, the method further comprises providing a status report from the device targeted for updating, to the update manager according to progress of replacing the versions executing on the device. In some embodiments, the device is a first device, and wherein the method further comprises distributing a first firmware updates of the firmware updates from the first device receiving the first firmware update, to a second device for updating the second device to replace a version executing on the second device of the plurality of device ensembles. In some embodiments, the second device is of the device ensemble. In some embodiments, the device ensemble is a first device ensemble, and wherein the second device is of a second device ensemble included in the plurality of device ensembles. In some embodiments, the first device and the second device are of the same device type. In some embodiments, the first device and the second device are of different device types. In some embodiments, the device is a first device, wherein the firmware update is a first firmware update. In some embodiments, the method further comprises sequentially or concurrently distributing a second firmware updates of the firmware updates to the second device receiving the second firmware update, which second device is of the plurality of device ensembles. In some embodiments, the bidirectional communication includes (1) the update manager initiating at least one handshake with at least one of the devices, (2) the update manager invoking an update engine in at least one of the devices, and/or (3) the update manager transferring at least one firmware update to at least one of the devices. In some embodiments, the update manager is initiating a plurality of handshakes with the devices concurrently or sequentially. In some embodiments, the update manager invokes an update engine in the devices concurrently or sequentially. In some embodiments, the update manager transfers firmware updates to the devices concurrently or sequentially. In some embodiments, the update manager transfers respective firmware updates to the devices concurrently or sequentially. In some embodiments, the bidirectional communication further includes at least one confirmation message forwarded from the at least one of the devices to the update manager. In some embodiments, a communication message of the at least one confirmation message includes a version information after successful install of the firmware update. In some embodiments, updating the device with the firmware update is selective. In some embodiments, the different devices are a first set of different devices, wherein the plurality of device ensembles comprises a second set of different devices, wherein different device ensembles of the plurality of device ensembles include the second set of the different devices that are of (e.g., substantially) the same type, and wherein at least two devices of the second set of different devices each receives the firmware update separately. In some embodiments, (e.g., each of) the at least two device of the second set of different devices receives the firmware update (i) sequentially with each other or (ii) concurrently with each other. In some embodiments, the plurality of device ensembles comprises a first device ensemble including a first device, and a second device ensemble including a second device that is of the same type of the first device, and wherein the first device and the second device receive the firmware update separately. In some embodiments, the first device and the second device each receives the firmware update (i) sequentially with each other or (ii) concurrently with each other. In some embodiments, the first device is configured to send the firmware update to the second device. In some embodiments, the first device and the second device receive the firmware update from the same source. In some embodiments, the source is another device. In some embodiments, the source resides in a processor or in a cloud. In some embodiments, the device ensemble includes a first device and a second device ensemble including a second device that is of the same type of the first device, and wherein the first device and the second device receive the firmware update separately concurrently or simultaneously. In some embodiments, the first device is configured to send the firmware update to the second device. In some embodiments, the first device and the second device receive the firmware update from the same source. In some embodiments, the source is another device. In some embodiments, the source resides in a processor or in a cloud. In some embodiments, the device receives the firmware update in a repeated spiderweb update scheme. In some embodiments, the network is configured for (i) power and data transmission on a cable, and/or (ii) installation on an envelope structure of a facility in which the local network is disposed and/or which the local network services. In some embodiments, the data includes (i) at least a fourth generation (4G) and/or fifth generation (5G) cellular communication protocol, (ii) media, and/or (iii) control protocol. In some embodiments, the network is configured for wired and/or communication. In some embodiments, the network includes coaxial and/or optical cables. In some embodiments, the network is configured to facilitate adjustment of an internal environment of a facility in which at least a portion of the network is disposed and/or which the network services. In some embodiments, the network comprises a control system which controls at least one apparatus in a facility in which at least a portion of the network is disposed and/or which the network services. In some embodiments, the control system comprises a hierarchy of controllers. In some embodiments, the at least one apparatus comprises a lighting device, a tintable window, a sensor, an emitter, a media display, a dispenser, a processor, a power source, a security system, a fire alarm system, a sound media, an antenna, a radar, a controller, a heater, a cooler, a vent, or a heating ventilation and air conditioning system (HVAC). In some embodiments, the controller comprises a microcontroller. In some embodiments, the control system comprises a building management system.

In another aspect, an apparatus for automatically updating firmware of devices operatively coupled to a network, the apparatus comprises at least one controller comprising circuitry, which at least one controller is configured to: (A) operatively couple to a network that is operatively coupled to a plurality of device ensembles including a device ensemble having different devices; (B) match, or direct match of, (a) a firmware update among firmware updates for the different devices with (b) the device; and (C) update, or direct update of, the device with the firmware update, which update is accomplished (i) without a reboot of the device and/or (ii) during normal operation of the device.

In some embodiments, the device ensemble comprises (I) a plurality of sensors or (II) a sensor and an emitter. In some embodiments, the different devices comprise at least two devices that differ in their device type. In some embodiments, the different devices comprise at least two devices that have the same device type. In some embodiments, the device ensemble is disposed in a fixture of a facility in which the plurality of device ensembles is disposed. In some embodiments, the at least one controller is further configured to store the firmware updates as images in an update manager, and wherein the device, the device ensemble, and/or the different devices, have bidirectional communication over the network with the update manager. In some embodiments, the firmware updates have been validated for the devices. In some embodiments, the update manager is included in a controller operatively coupled to the network, which controller is disposed in a facility in which the plurality of device ensembles is located. In some embodiments, the update manager is included in a controller disposed externally with respect to the facility, and is coupled to the network by a cloud connection. In some embodiments, the at least one controller is further configured such that the update manager offers one or more firmware updates to a user via a user interface. In some embodiments, the at least one controller is further configured to enable a user to select a timing for distributing and/or installing the one or more firmware updates. In some embodiments, the one or more firmware updates are configured for one or more devices. In some embodiments, the one or more firmware updates are configured for the one or more devices. In some embodiments, the one or more firmware updates are configured for one or more devices respectively. In some embodiments, the at least one controller is further configured to (1) recognize the device and corresponding firmware version configured to execute on the device, and (2) target the device for updating by distributing firmware update to replace the version executing on the device. In some embodiments, the at least one controller is further configured to recognize the device according to the devices in a facility in which the plurality of device ensembles is disposed. In some embodiments, the at least one controller is further configured to provide a status report from the device targeted for updating to the update manager according to progress of replacing the versions executing on the device. In some embodiments, the device is a first device, and wherein the at least one controller is further configured to distribute a first firmware update of the firmware updates from the first device receiving the first firmware update, to a second device for updating the second device to replace a version executing on the second device of the plurality of device ensembles. In some embodiments, the second device is of the device ensemble. In some embodiments, the device ensemble is a first device ensemble, and wherein the second device is of a second device ensemble included in the plurality of device ensembles. In some embodiments, the first device and the second device are of the same device type. In some embodiments, the first device and the second device are of different device types. In some embodiments, the device is a first device, wherein the firmware update is a first firmware update, and wherein the at least one controller is further configured to sequentially or concurrently distribute a second firmware updates of the firmware updates to the second device receiving the second firmware update, which second device is of the plurality of device ensembles. In some embodiments, the at least one controller is further configured such that the bidirectional communication causes (1) the update manager to initiate at least one handshake with at least one of the devices, (2) the update manager to invoke an update engine in at least one of the devices, and/or (3) the update manager to transfer at least one firmware update to at least one of the devices. In some embodiments, the at least one controller is further configured to cause the update manager to initiate a plurality of handshakes with the devices concurrently or sequentially. In some embodiments, the at least one controller is further configured to cause the update manager to invoke an update engine in the devices concurrently or sequentially. In some embodiments, the at least one controller is further configured to cause the update manager to transfer firmware updates to the devices concurrently or sequentially. In some embodiments, the at least one controller is further configured to cause the update manager to transfer respective firmware updates to the devices concurrently or sequentially. In some embodiments, the at least one controller is further configured to cause the bidirectional communication to include at least one confirmation message forwarded from the at least one of the devices to the update manager. In some embodiments, a communication message of the at least one confirmation message includes a version information after successful install of the firmware update. In some embodiments, the at least one controller is further configured to update the device with the firmware update selectively. In some embodiments, the different devices are a first set of different devices, wherein the plurality of device ensembles comprises a second set of different devices, wherein different device ensembles of the plurality of device ensembles include the second set of the different devices that are of (e.g., substantially) the same type, and wherein at least two devices of the second set of different devices each receives the firmware update separately. In some embodiments, each of the at least two device of the second set of different devices receives the firmware update (i) sequentially with each other or (ii) concurrently with each other. In some embodiments, the plurality of device ensembles comprises a first device ensemble including a first device, and a second device ensemble including a second device that is of the same type of the first device, and wherein the first device and the second device receive the firmware update separately. In some embodiments, the at least one controller is further configured such that the first device and the second device each receive the firmware update (i) sequentially with each other or (ii) concurrently with each other. In some embodiments, the first device is configured to send the firmware update to the second device. In some embodiments, the first device and the second device receive the firmware update from the same source. In some embodiments, the source is another device. In some embodiments, the source resides in a processor or in a cloud. In some embodiments, the device ensemble includes a first device and a second device ensemble including a second device that is of the same type of the first device, and wherein the first device and the second device receive the firmware update separately concurrently or simultaneously. In some embodiments, the first device is configured to send the firmware update to the second device. In some embodiments, the first device and the second device receive the firmware update from the same source. In some embodiments, the source is another device. In some embodiments, the source resides in a processor or in a cloud. In some embodiments, the device receives the firmware update in a repeated spiderweb update scheme. In some embodiments, the network is configured for (i) power and data transmission on a cable, and/or (ii) installation on an envelope structure of a facility in which the local network is disposed and/or which the local network services. In some embodiments, the data includes (i) at least a fourth generation (4G) and/or fifth generation (5G) cellular communication protocol, (ii) media, and/or (iii) control protocol. In some embodiments, the network is configured for wired and/or communication. In some embodiments, the network includes coaxial and/or optical cables. In some embodiments, the network is configured to facilitate adjustment of an internal environment of a facility in which at least a portion of the network is disposed and/or which the network services. In some embodiments, the network comprises a control system which controls at least one apparatus in a facility in which at least a portion of the network is disposed and/or which the network services. In some embodiments, the control system comprises a hierarchy of controllers. In some embodiments, the at least one apparatus comprises a lighting device, a tintable window, a sensor, an emitter, a media display, a dispenser, a processor, a power source, a security system, a fire alarm system, a sound media, an antenna, a radar, a controller, a heater, a cooler, a vent, or a heating ventilation and air conditioning system (HVAC). In some embodiments, the controller comprises a microcontroller. In some embodiments, the control system comprises a building management system. In some embodiments, the control system comprises the at least one controller. In some embodiments, at least two operations are performed/directed by the same controller. In some embodiments, at less at two operations are each performed/directed by a different controller.

In another aspect, a non-transitory computer readable media for automatically updating firmware of devices operatively coupled to a network, the non-transitory computer readable media, when read by one or more processors operatively coupled to the network, is configured to direct operations comprising: (A) matching, or directing match of, (a) a firmware update among firmware updates for different devices with (b) a device of a device ensemble among a plurality of device ensembles, which device ensemble comprises the different devices, wherein the plurality of device ensembles is coupled to a network; and (B) updating, or directing update of, the device with the firmware update, which updating is accomplished (i) without rebooting the device and/or (ii) during normal operation of the device.

In some embodiments, the device ensemble comprises (I) a plurality of sensors or (II) a sensor and an emitter. In some embodiments, the different devices comprise at least two devices that differ in their device type. In some embodiments, the different devices comprise at least two devices that have the same device type. In some embodiments, the device ensemble is disposed in a fixture of a facility in which the plurality of device ensembles is disposed. In some embodiments, the operations comprise storing the firmware updates as images in an update manager, and wherein the device, the device ensemble, and/or the different devices, have bidirectional communication over the network with the update manager. In some embodiments, the firmware updates have been validated for the devices. In some embodiments, the update manager is included in a controller operatively coupled to the network, which controller is disposed in a facility in which the plurality of device ensembles is located. In some embodiments, the update manager is included in a controller disposed externally with respect to the facility, and is coupled to the network by a cloud connection. In some embodiments, the operations comprise the update manager offering available one or more firmware updates to a user via a user interface. In some embodiments, the operations comprise selecting by a user a timing for distributing and/or installing the one or more firmware updates. In some embodiments, the one or more firmware updates are configured for one or more devices. In some embodiments, the one or more firmware updates are configured for the one or more devices. In some embodiments, the one or more firmware updates are configured for one or more devices respectively. In some embodiments, the operations comprise (1) recognizing the device and corresponding firmware version configured to execute on the device, and (2) targeting the device for updating by distributing firmware update to replace the version executing on the device. In some embodiments, recognizing the device is adapted according to the devices in a facility in which the plurality of device ensembles is disposed. In some embodiments, the operations comprise providing a status report from the device targeted for updating, to the update manager according to progress of replacing the versions executing on the device. In some embodiments, the device is a first device, and wherein the operations comprise distributing a first firmware updates of the firmware updates from the first device receiving the first firmware update, to a second device for updating the second device to replace a version executing on the second device of the plurality of device ensembles. In some embodiments, the second device is of the device ensemble. In some embodiments, the device ensemble is a first device ensemble, and wherein the second device is of a second device ensemble included in the plurality of device ensembles. In some embodiments, the first device and the second device are of the same device type. In some embodiments, the first device and the second device are of different device types. In some embodiments, the device is a first device, wherein the firmware update is a first firmware update, and wherein the operations comprise sequentially or concurrently distributing a second firmware updates of the firmware updates to the second device receiving the second firmware update, which second device is of the plurality of device ensembles. In some embodiments, the operations directing the bidirectional communication include (1) the update manager initiating at least one handshake with at least one of the devices, (2) the update manager invoking an update engine in at least one of the devices, and/or (3) the update manager transferring at least one firmware update to at least one of the devices. In some embodiments, the operations include the update manager initiating a plurality of handshakes with the devices concurrently or sequentially. In some embodiments, the operations comprise the update manager invoking an update engine in the devices concurrently or sequentially. In some embodiments, the operations comprise the update manager transferring firmware updates to the devices concurrently or sequentially. In some embodiments, the operations comprise the update manager transferring respective firmware updates to the devices concurrently or sequentially. In some embodiments, the operations comprise the bidirectional communication including at least one confirmation message forwarded from the at least one of the devices to the update manager. In some embodiments, a communication message of the at least one confirmation message includes a version information after successful install of the firmware update. In some embodiments, updating the device with the firmware update is selective. In some embodiments, the different devices are a first set of different devices, wherein the plurality of device ensembles comprises a second set of different devices, wherein different device ensembles of the plurality of device ensembles include the second set of the different devices that are of (e.g., substantially) the same type, and wherein at least two In some embodiments, the operations comprise each of the at least two device of the second set of different devices receiving the firmware update (i) sequentially with each other or (ii) concurrently with each other. In some embodiments, the plurality of device ensembles comprises a first device ensemble including a first device, and a second device ensemble including a second device that is of the same type of the first device, and wherein the first device and the second device receive the firmware update separately. In some embodiments, the operations comprise the first device and the second device each receiving the firmware update (i) sequentially with each other or (ii) concurrently with each other. In some embodiments, the operations comprise the first device sending the firmware update to the second device. In some embodiments, the first device and the second device receive the firmware update from the same source. In some embodiments, the source is another device. In some embodiments, the source resides in a processor or in a cloud. In some embodiments, n the device ensemble includes a first device and a second device ensemble including a second device that is of the same type of the first device, and wherein the operations comprise the first device and the second device receiving the firmware update separately, concurrently, or simultaneously. In some embodiments, the operations comprise the first device sending the firmware update to the second device. In some embodiments, the operations comprise the first device and the second device receiving the firmware update from the same source. In some embodiments, the source is another device. In some embodiments, the source resides in a processor or in a cloud. In some embodiments, the operations comprise the device receiving the firmware update in a repeated spiderweb update scheme. In some embodiments, the network is configured for (i) power and data transmission on a cable, and/or (ii) installation on an envelope structure of a facility in which the local network is disposed and/or which the local network services. In some embodiments, the data includes (i) at least a fourth generation (4G) and/or fifth generation (5G) cellular communication protocol, (ii) media, and/or (iii) control protocol. In some embodiments, the network is configured for wired and/or communication. In some embodiments, the network includes coaxial and/or optical cables. In some embodiments, the network is configured to facilitate adjustment of an internal environment of a facility in which at least a portion of the network is disposed and/or which the network services. In some embodiments, the network comprises a control system which controls at least one apparatus in a facility in which at least a portion of the network is disposed and/or which the network services. In some embodiments, the control system comprises a hierarchy of controllers. In some embodiments, the at least one apparatus comprises a lighting device, a tintable window, a sensor, an emitter, a media display, a dispenser, a processor, a power source, a security system, a fire alarm system, a sound media, an antenna, a radar, a controller, a heater, a cooler, a vent, or a heating ventilation and air conditioning system (HVAC). In some embodiments, the controller comprises a microcontroller. In some embodiments, the control system comprises a building management system. In some embodiments, the control system comprises the one or more processors. In some embodiments, at least two operations are performed/directed by the same processor. In some embodiments, at less at two operations are each performed/directed by a different processor.

In another aspect, a method for updating firmware of firmware driven devices in a network, the method comprises: (A) maintaining a database identifying the firmware driven devices in the network, wherein the firmware driven devices include a respective update engine; (B) collecting validated firmware update images for respective ones of the firmware driven devices; (C) selecting firmware driven devices with respective firmware update images to be updated; (D) commanding a firmware update manager coupled to the network to coordinate updating a specific device within the firmware driven devices, wherein the firmware update manager is configured to communicate with the respective update engine; (E) the firmware update manager initiating a handshake with the specific device; (F) the firmware update manager invoking the respective update engine in the specific device; (G) the firmware update manager transferring a respective firmware update image to the specific device; (H) the specific device installing the respective firmware update image; and (I) the specific device forwarding a confirmation message to the firmware update manager including a version information for the installed firmware update image.

In some embodiments, selection of the firmware driven devices to be updated is comprised of (i) matching firmware driven devices with respective firmware update images that are not yet installed, (ii) offering available updates to a user via a user interface, and (iii) the user selecting a matched firmware driven device and respective firmware update image. In some embodiments, selection of the firmware driven devices to be updated is performed automatically. In some embodiments, the plurality of firmware driven devices includes at least one group of (e.g., substantially) identical devices which utilize (e.g., substantially) identical firmware, wherein the validated firmware update images include a common firmware image for the group. In some embodiments, the method further comprises collectively launching updating of the group with the common firmware image. In some embodiments, the firmware update manager initiates a respective handshake with specific devices in the group, wherein the firmware update manager invokes the respective update engine in the specific devices in the group, and wherein the firmware update manager transfers the common firmware image separately to the specific devices in the group.

In another aspect, the present disclosure provides systems, apparatuses (e.g., controllers), and/or non-transitory computer-readable medium (e.g., software) that implement any of the methods disclosed herein.

In another aspect, the present disclosure provides methods that use any of the systems, computer readable media, and/or apparatuses disclosed herein, e.g., for their intended purpose.

In another aspect, an apparatus comprises at least one controller that is programmed to direct a mechanism used to implement (e.g., effectuate) any of the method disclosed herein, which at least one controller is configured to operatively couple to the mechanism. In some embodiments, at least two operations (e.g., of the method) are directed/executed by the same controller. In some embodiments, at less at two operations are directed/executed by different controllers.

In another aspect, an apparatus comprises at least one controller that is configured (e.g., programmed) to implement (e.g., effectuate) any of the methods disclosed herein.

The at least one controller may implement any of the methods disclosed herein. In some embodiments, at least two operations (e.g., of the method) are directed/executed by the same controller. In some embodiments, at less at two operations are directed/executed by different controllers.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may be configured to direct any apparatus (or component thereof) disclosed herein. The at least one controller may be configured to operatively couple to any apparatus (or component thereof) disclosed herein. In some embodiments, at least two operations (e.g., of the apparatus) are directed by the same controller. In some embodiments, at less at two operations are directed by different controllers.

In another aspect, a computer software product, comprising a non-transitory computer-readable medium in which program instructions are stored, which instructions, when read by at least one processor (e.g., computer), cause the at least one processor to direct a mechanism disclosed herein to implement (e.g., effectuate) any of the method disclosed herein, wherein the at least one processor is configured to operatively couple to the mechanism. The mechanism can comprise any apparatus (or any component thereof) disclosed herein. In some embodiments, at least two operations (e.g., of the apparatus) are directed/executed by the same processor. In some embodiments, at less at two operations are directed/executed by different processors.

In another aspect, the present disclosure provides a non-transitory computer-readable medium comprising machine-executable code that, upon execution by one or more processors, implements any of the methods disclosed herein. In some embodiments, at least two operations (e.g., of the method) are directed/executed by the same processor. In some embodiments, at less at two operations are directed/executed by different processors.

In another aspect, the present disclosure provides a non-transitory computer-readable medium comprising machine-executable code that, upon execution by one or more processors, effectuates directions of the controller(s) (e.g., as disclosed herein). In some embodiments, at least two operations (e.g., of the controller) are directed/executed by the same processor. In some embodiments, at less at two operations are directed/executed by different processors.

In another aspect, the present disclosure provides a computer system comprising one or more computer processors and a non-transitory computer-readable medium coupled thereto. The non-transitory computer-readable medium comprises machine-executable code that, upon execution by the one or more processors, implements any of the methods disclosed herein and/or effectuates directions of the controller(s) disclosed herein.

The content of this summary section is provided as a simplified introduction to the disclosure and is not intended to be used to limit the scope of any invention disclosed herein or the scope of the appended claims.

The disclosure provided herein regarding device(s) can be applicable to respective component(s). The disclosure provided herein regarding firmware can be applicable to software.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

Figure 1:
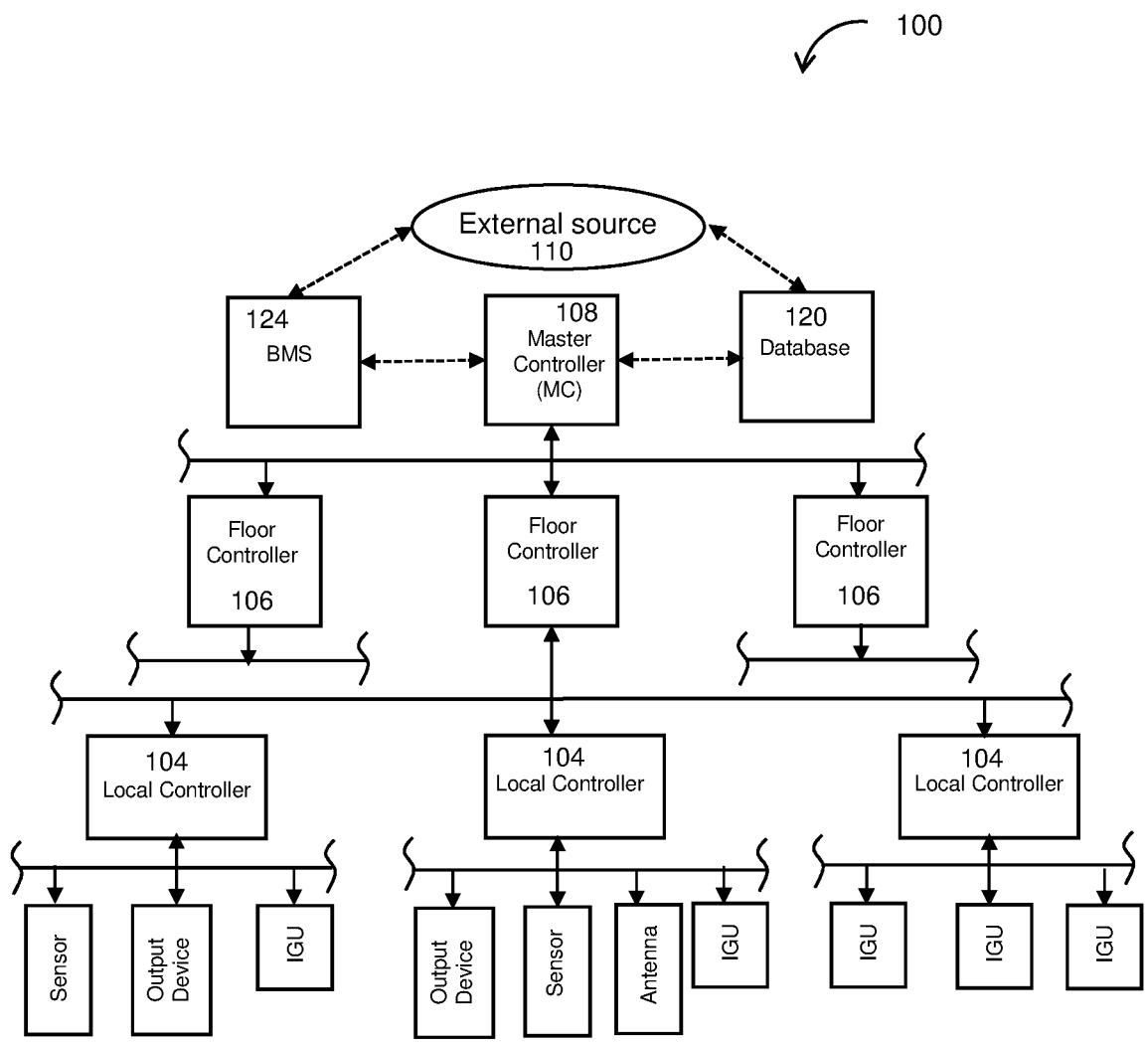
FIG. 1 schematically shows a control system and its various components.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

The term "operatively coupled" or "operatively connected" refers to a first element (e.g., mechanism) that is coupled (e.g., connected) to a second element, to allow the intended operation of the second and/or first element. The coupling may comprise physical or non-physical coupling (e.g., communicative coupling). The non-physical coupling may comprise signal-induced coupling (e.g., wireless coupling). Coupled can include physical coupling (e.g., physically connected), or non-physical coupling (e.g., via wireless communication). Operatively coupled may comprise communicatively coupled.

An element (e.g., mechanism) that is "configured to" perform a function includes a structural feature that causes the element to perform this function. A structural feature may include an electrical feature, such as a circuitry or a circuit element. A structural feature may include an actuator. A structural feature may include a circuitry (e.g., comprising electrical or optical circuitry). Electrical circuitry may comprise one or more wires. Optical circuitry may comprise at least one optical element (e.g., beam splitter, mirror, lens and/or optical fiber). A structural feature may include a mechanical feature. A mechanical feature may comprise a latch, a spring, a closure, a hinge, a chassis, a support, a fastener, a leaf, or a cantilever, and so forth. Performing the function may comprise utilizing a logical feature. A logical feature may include programming instructions. Programming instructions may be executable by at least one processor. Programming instructions may be stored or encoded on a medium accessible by one or more processors. In the following description, the phrases "operable to," "adapted to," "configured to," "designed to," "programmed to," or "capable of" may be used interchangeably where appropriate.

In some embodiments, an enclosure comprises an area defined by at least one structure. The at least one structure may comprise at least one wall. An enclosure may comprise and/or enclose one or more sub-enclosure. The at least one wall may comprise metal (e.g., steel), clay, stone, plastic, glass, plaster (e.g., gypsum), polymer (e.g., polyurethane, styrene, or vinyl), asbestos, fiber-glass, concrete (e.g., reinforced concrete), wood, paper, or a ceramic. The at least one wall may comprise wire, bricks, blocks (e.g., cinder blocks), tile, drywall, or frame (e.g., steel frame).

In some embodiments, the enclosure comprises one or more openings. The one or more openings may be reversibly closable (e.g., closable and openable). The one or more openings may be permanently open. A fundamental length scale of the one or more openings may be smaller relative to the fundamental length scale of the wall(s) that define the enclosure. A fundamental length scale may comprise a diameter of a bounding circle, a length, a width, or a height. A surface of the one or more openings may be smaller relative to the surface the wall(s) that define the enclosure. The opening surface may be a percentage of the total surface of the wall(s). For example, the opening surface can measure about 30%, 20%, 10%, 5%, or 1% of the walls(s). The wall(s) may comprise a floor, a ceiling or a side wall. The closable opening may be closed by at least one window or door. The enclosure may be at least a portion of a facility. The enclosure may comprise at least a portion of a building. The building may be a private building and/or a commercial building. The building may comprise one or more floors. The building (e.g., floor thereof) may include: a room, hall, foyer, attic, basement, balcony (e.g., inner or outer balcony), stairwell, corridor, elevator shaft, façade, mezzanine, penthouse, garage, porch (e.g., enclosed porch), terrace (e.g., enclosed terrace), cafeteria, and/or Duct. In some embodiments, an enclosure may be stationary and/or movable (e.g., a train, a plane, a ship, a vehicle, or a rocket).

In some embodiments, the enclosure encloses an atmosphere. The atmosphere may comprise one or more gases. The gases may include inert gases (e.g., argon or nitrogen) and/or non-inert gases (e.g., oxygen or carbon dioxide). %% The enclosure atmosphere may resemble an atmosphere external to the enclosure (e.g., ambient atmosphere) in at least one external atmosphere characteristic that includes: temperature, relative gas content, gas type (e.g., humidity, and/or oxygen level), debris (e.g., dust and/or pollen), and/or gas velocity. The enclosure atmosphere may be different from the atmosphere external to the enclosure in at least one external atmosphere characteristic that includes: temperature, relative gas content, gas type (e.g., humidity, and/or oxygen level), debris (e.g., dust and/or pollen), and/or gas velocity. For example, the enclosure atmosphere may be less humid (e.g., drier) than the external (e.g., ambient) atmosphere. For example, the enclosure atmosphere may contain the same (e.g., or a substantially similar) oxygen-to-nitrogen ratio as the atmosphere external to the enclosure. The velocity of the gas in the enclosure may be (e.g., substantially) similar throughout the enclosure. The velocity of the gas in the enclosure may be different in different portions of the enclosure (e.g., by flowing gas through to a vent that is coupled with the enclosure).

Certain disclosed embodiments provide a network infrastructure in the enclosure (e.g., a facility such as a building). The network infrastructure is available for various purposes such as for providing communication and/or power services. The communication services may comprise high bandwidth (e.g., wireless and/or wired) communications services. The communication services can be to occupants of a facility and/or users outside the facility (e.g., building). The network infrastructure may work in concert with, or as a partial replacement of, the infrastructure of one or more cellular carriers. The network infrastructure can be provided in a facility that includes electrically switchable windows. Examples of components of the network infrastructure include a high speed backhaul. The network infrastructure may include at least one cable, switch, physical antenna, transceivers, sensor, transmitter, receiver, radio, processor and/or controller (that may comprise a processor). The network infrastructure may be operatively coupled to, and/or include, a wireless network. The network infrastructure may comprise wiring. One or more sensors can be deployed (e.g., installed) in an environment as part of installing the network and/or after installing the network.

In some embodiments, the control system is operatively (e.g., communicatively) coupled to the component(s). The control system may be configured to communicate with one or more components (e.g., nodes) on a horizontal and/or vertical data plane using a physical and/or link layer protocol (such as G.hn protocol and/or MoCA). The G.hn protocol may allow the transmission of data over any wire medium. Data rates within the G.hn protocol may be in the range of from about 100 megabit/sec up to about 1.7 Gb/sec. The G.hn protocol may utilize signals from about 2 MHz to about 200 MHz. The G.hn protocol, as implemented herein, may be tolerate of cables with imperfections (e.g., such as those created by tapping bus lines to branch lines, such as via a distribution junction).

In some embodiments, the control system comprises a control panel that includes at least one communication headend. For example, the control panel may include MoCA and/or G.hn head-ends. The headend may be configured to determine physical topology of the horizontal and/or vertical data plane based at least in part upon the profile of the power spectrum provided at the headend. Notches in the power spectrum may be produced by nodes on the network. The size and location of the notches on the power spectrum may correspond to the physical topology of the network served by the headend. A communication (e.g., G.hn) headend may be configured to identify the portion of its allocated frequency spectrum to use for communications, e.g., so as not to accidentally use low power portions of the spectrum. In certain embodiments, communication (e.g., G.hn) data is transmitted in point to multipoint fashion on a horizontal and/or vertical data plane. In some embodiments, a master (the G.hn headend) sends data to multiple slave nodes (end nodes on the horizontal and/or vertical data plane). In certain embodiments, slave nodes do not communicate directly to each other. In certain embodiments, slave nodes do communicate directly among themselves.

In certain embodiments, a local network infrastructure has a vertical data plane (between building floors) and one or more horizontal data planes (within a floor or in multiple (e.g., contiguous) floors). In some cases, the horizontal and vertical data planes have (e.g., substantially) the same or similar data carrying capabilities and/or data communication carrying components. In other cases, these two data planes have at least one different data carrying capability. In one example, the vertical data plane contains data carrying communication components that support at least about 10 Gigabit/second or faster Ethernet transmissions (e.g., using UTP wires and/or fiber optic cables), and the horizontal data plane contains data carrying components that also support at least about 10 Gigabit/second or faster gigabit Ethernet transmissions, e.g., via optical fiber. In some cases, the horizontal data plane supports data transmission via a communication protocol (e.g., G.hn protocol and/or a MoCA protocol such as the MoCA 2.5 standard or the MoCA 3.0 standard). In certain embodiments, connections between at least two floors on the vertical data plane employ control panels with (e.g., high speed) Ethernet switches. These same control panels may communicate with node(s) on a given floor via a (e.g., high-speed) a switch (e.g., optical fiber switch) and/or a communication protocol (e.g., MoCA) interface and associated (e.g., coaxial) cables disposed on the horizontal data plane.

In some embodiments, an end components (e.g., device) such as a tintable (e.g., electrochromic) window may (e.g., only) require low-speed data communication. Accordingly, coaxial cable network branches including branch devices requiring lower-speed data communication may include low-speed devices such as G.hn devices. In order to implement G.hn power-line communication in a coaxial cable network branch, a G.hn headend device may be provided in the headend unit in the corresponding distributed control panel. In order to implement G.hn power-line communication in a coaxial cable network branch, a G.hn transceiver may be installed at each branch device (and/or at the corresponding device controller), e.g., to receive and/or transmit G.hn communications. Although the G.hn standard may enable data transmission at rates of up to about 2 Gbit/s, transmission rates may (e.g., only) be up to about 200 Mbit/s in practice. G.hn devices may transmit data over a frequency band from about 10 MHz to about 70 MHz.

In some embodiments, transmission of data across different frequency bands (e.g., also referred to herein as "frequency windows," or "signal frequency set") and/or at different rates across the same coaxial cable branch line may be achieved, e.g., by communicating using multiple protocols simultaneously (for example by transmitting a first signal frequency set compliant with MoCA protocol, and transmitting a second signal frequency set compliant with G.hn protocol). Appropriately tuned filters (e.g., Inductor and Capacitor filters (LC filters)) can be used to selectively inject signals in desired communication bands from the coaxial cable branch line into the appropriate drop lines, or to hinder (e.g., block) transmission of power-line communication (PLC) signals, e.g., to avoid interference such as when different branch devices are controlled on a single branch line. Examples of network configuration, control, operation, and operative coupling to components(s) (e.g., target devices) can be found in U.S. Provisional Patent Application Ser. No. 63/027,452 filed May 20, 2020 titled "DATA AND POWER NETWORK OF AN ENCLOSURE," which is incorporated herein by reference in its entirety.

In some embodiments, an enclosure includes one or more sensors. The sensor may facilitate controlling the environment of the enclosure such that inhabitants of the enclosure may have an environment that is more comfortable, delightful, beautiful, healthy, productive (e.g., in terms of inhabitant performance), easer to live (e.g., work) in, or any combination thereof. The sensor(s) may be configured as low or high resolution sensors. Sensor may provide on/off indications of the occurrence and/or presence of a particular environmental event (e.g., one pixel sensors). In some embodiments, the accuracy and/or resolution of a sensor may be improved via artificial intelligence analysis of its measurements. Examples of artificial intelligence techniques that may be used include: reactive, limited memory, theory of mind, and/or self-aware techniques know to those skilled in the art). Sensors may be configured to process, measure, analyze, detect and/or react to one or more of: data, temperature, humidity, sound, force, pressure, electromagnetic waves, position, distance, movement, flow, acceleration, speed, vibration, dust, light, glare, color, gas(es), and/or other aspects (e.g., characteristics) of an environment (e.g., of an enclosure). The gases may include volatile organic compounds (VOCs). The gases may include carbon monoxide, carbon dioxide, Nitric oxide (NO), nitrogen dioxide ($NO_2$), water vapor (e.g., humidity), oxygen, radon, and/or hydrogen sulfide. In some situations, a factory-calibrated sensor may provide readings that do not meet accuracy specifications (e.g., by a manufacturer) when operated in the target environments. The one or more sensors may be calibrated in a factory setting or in a target environment. The target environment can be an environment in which the sensor is deployed. The target environment can be an environment in which the sensor is expected and/or destined to operate. The target environment may differ from a factory environment. A factory environment corresponds to a location at which the sensor was assembled and/or built. The target environment may comprise a factory in which the sensor was not assembled and/or built. In some instances, the factory setting may differ from the target environment to the extent that sensor readings captured in the target environment are erroneous (e.g., to a measurable extent).

In some embodiments, a plurality of components (e.g., devices) may be operatively (e.g., communicatively) coupled to the local network and/or to a control system. The plurality of components may be disposed in a facility (e.g., including a building and/or room). The control system may comprise the hierarchy of controllers. The components may comprise an emitter, a sensor, or a window (e.g., IGU). The components may be any components disclosed herein. At least two of the plurality of components may be of the same type. For example, two or more IGUs may be coupled to the control system. At least two of the plurality of components may be of different types. For example, a sensor and an emitter may be coupled to the local network. At times the plurality of components may comprise at least 20, 50, 100, 500, 1000, 2500, 5000, 7500, 10000, 50000, 100000, or 500000 components. The plurality of components may be of any number between the aforementioned numbers (e.g., from 20 components to 500000 components, from 20 components to 50 components, from 50 components to 500 components, from 500 components to 2500 components, from 1000 components to 5000 components, from 5000 components to 10000 components, from 10000 components to 100000 components, or from 100000 components to 500000 components). For example, the number of windows in a floor may be at least 5, 10, 15, 20, 25, 30, 40, or 50. The number of windows in a floor can be any number between the aforementioned numbers (e.g., from 5 to 50, from 5 to 25, or from 25 to 50). At times the components may be disposed in a multi-story building. At least a portion of the floors of the multi-story building may have components controlled by the control system (e.g., at least a portion of the floors of the multi-story building may be controlled by the control system). For example, the multi-story building may have at least 2, 8, 10, 25, 50, 80, 100, 120, 140, or 160 floors that are controlled by the control system. The number of floors (e.g., components therein) controlled by the control system may be any number between the aforementioned numbers (e.g., from 2 to 50, from 25 to 100, or from 80 to 160). The floor may be of an area of at least about 150 m$^2$, 250 m$^2$, 500 m$^2$, 1000 m$^2$, 1500 m$^2$, or 2000 square meters (m$^2$). The floor may have an area between any of the aforementioned floor area values (e.g., from about 150 m$^2$ to about 2000 m$^2$, from about 150 m$^2$ to about 500 m$^2$ from about 250 m$^2$ to about 1000 m$^2$, or from about 1000 m$^2$ to about 2000 m$^2$). The building may be a residential building (e.g., multi family building, or single family home)

In some embodiments, the sensor(s) are operatively coupled to at least one controller and/or processor. Sensor readings may be obtained by one or more processors and/or controllers. A controller may comprise a processing unit (e.g., CPU or GPU). A controller may receive an input (e.g., from at least one sensor). The controller may include circuitry, electrical wiring, optical wiring, socket, and/or outlet. A controller may deliver an output. A controller may comprise sub-controller(s). The controller may be included in a control system. A control system may comprise a master controller, floor (e.g., comprising network controller) controller, or a local controller. The local controller may be a window controller (e.g., controlling a tintable windows such as an optically switchable window), enclosure controller, or component controller. The controller can be a device controller (e.g., any device disclosed herein). For example, a controller may be included in a hierarchal control system (e.g., comprising a main controller that directs one or more controllers, e.g., floor controllers, local controllers (e.g., window controllers), enclosure controllers, and/or component controllers such as device controllers). A physical location of the controller type in the hierarchal control system may be changing. For example, at a first time: a first processor may assume a role of a main controller, a second processor may assume a role of a floor controller, and a third processor may assume the role of a local controller. At a second time: the second processor may assume a role of a main controller, the first processor may assume a role of a floor controller, and the third processor may remain with the role of a local controller. At a third time: the third processor may assume a role of a main controller, the second processor may assume a role of a floor controller, and the first processor may assume the role of a local controller. A controller may control one or more components (e.g., and be directly coupled to the components). In some embodiments, direct coupling of a first controller to a first component negates presence of another component and/or another controller between the first controller and the first device. In some embodiments, direct coupling of a first controller to a first component is with a wiring that is connected to the first component on one end and to the first controller on its opposing end, and does not connect to another component and/or to another controller therebetween. A controller may be disposed proximal to the one or more components it is controlling. For example, a controller may control an optically switchable device (e.g., IGU), an antenna, a sensor, and/or an output device (e.g., an emitter such as a light source, sounds source, smell source, gas source, HVAC outlet, or heater). In one embodiment, a floor controller may direct one or more local controllers such as window controllers, one or more enclosure controllers, one or more component controllers, or any combination thereof. The floor controller may comprise a floor controller. For example, the floor (e.g., comprising network) controller may control a plurality of local controllers. A plurality of local controllers may be disposed in a portion of a facility (e.g., in a portion of a building). The portion of the facility may be a floor of a facility. For example, a floor controller may be assigned to a floor or to a portion of a floor (e.g., in case the floor is large and/or the components disposed in the floor and/or the local controllers controlling them, exceed a capacity of one floor controller). In some embodiments, a floor may comprise a plurality of floor controllers, e.g., depending on the floor size and/or the number of local controllers coupled to the floor controller. For example, a floor controller may be assigned to a portion of a floor. For example, a floor controller may be assigned to a portion of the local controllers disposed in the facility. For example, a floor controller may be assigned to a portion of the floors of a facility. A master controller may be coupled to one or more floor controllers. The floor controller may be disposed in the facility. The master controller may be disposed in the facility, or external to the facility. The master controller may be disposed in the cloud or operatively coupled to the cloud. A controller may be a part of, or be operatively coupled to, a building management system. A controller may receive one or more inputs. A controller may generate one or more outputs. The controller may be a single input single output controller (SISO) or a multiple input multiple output controller (MIMO). A controller may interpret an input signal received. A controller may acquire data from the one or more components (e.g., sensors). Acquire may comprise receive or extract. The data may comprise measurement, estimation, determination, generation, or any combination thereof. A controller may comprise a feedback control scheme. A controller may comprise a feed-forward control scheme. Control may comprise on-off control, proportional control, proportional-integral (PI) control, or proportional-integral-derivative (PID) control. Control may comprise an open loop control, or a closed loop control scheme. A controller may comprise a closed loop control scheme. A controller may comprise an open loop control scheme. A controller may comprise, or be operatively coupled to, a user interface. A user interface may comprise (or operatively coupled to) a keyboard, keypad, mouse, touch screen, microphone, speech recognition package, camera, imaging system, or any combination thereof. Outputs may include a display (e.g., screen), speaker, and/or printer.

FIG. 1 shows an example of a control system architecture 100 comprising a master controller 108 that controls floor controllers 106, that in turn control local controllers 104. In some embodiments, a local controller controls one or more IGUs, one or more sensors, one or more output devices (e.g., one or more emitters), or any combination thereof. FIG. 1 shows an example of a configuration in which the master controller is operatively coupled (e.g., wirelessly and/or wired) to a building management system (BMS) 124 and to a database 120. Arrows in FIG. 1 represents communication pathways. A controller may be operatively coupled (e.g., directly/indirectly and/or wired and/wirelessly) to an external source 110. The external source may comprise a network. The external source may comprise one or more sensor or output device. The external source may comprise a cloud-based application and/or database. The communication may be wired and/or wireless. The external source may be disposed external to the facility. For example, the external source may comprise one or more sensors and/or antennas disposed, e.g., on a wall or on a ceiling of the facility. The communication may be monodirectional or bidirectional. In the example shown in FIG. 1, the communication all communication arrows are meant to be bidirectional.

Sensors and/or other devices of an ensemble may be organized into a module or box. An ensemble may comprise at least one circuit board, such as a printed circuit board, in which a number of sensors, emitters, or other components are adhered or affixed to the circuit board. Sensors can be removable from a sensor module. For example, a sensor may be plugged and/or unplugged from the circuit board. Sensors may be individually activated and/or deactivated (e.g., using a switch). The circuit board may comprise a polymer. The circuit board may be transparent or non-transparent. The circuit board may comprise metal (e.g., elemental metal and/or metal alloy). The circuit board may comprise a conductor. The circuit board may comprise an insulator. The circuit board may comprise any geometric shape (e.g., rectangle or ellipse). The circuit board may be configured (e.g., may be of a shape) to allow the ensemble to be disposed in a framing portion such as a mullion or a transom (e.g., of a window). The circuit board may be configured (e.g., may be of a shape) to allow the ensemble to be disposed in a frame (e.g., door frame and/or window frame). The mullion and/or frame may comprise one or more holes to allow the sensor(s) to obtain (e.g., accurate) readings. The circuit board may include an electrical connectivity port (e.g., socket). The circuit board may be connected to a power source (e.g., to electricity). The power source may comprise renewable or non-renewable power source. The circuit board may comprise a temperature regulating component such as a heat sink and/or vent. If the ensemble comprises a plurality of circuit boards, at least two of the plurality of circuit boards may be disposed in the same planes or in parallel planes. The circuit boards may be disposed in a manner that facilitates heat dissipation, at least during operation. For example, the circuit boards may be separated by a gap. The circuit boards may comprise a plurality of processors. At least two of the processors may be of the same type. At least two of the processors may be of a different type.

In some embodiments, the control system is operatively (e.g., communicatively) coupled to an ensemble of components (e.g., sensors and/or emitters). The ensemble may facilitate control of at least one environment in the facility, energy consumption, safety, health, monitor personnel in, and incoming to, the facility, and/or initiate alert. The control may utilize a control scheme such as feedback control, or any other control scheme delineated herein. The ensemble may comprise at least one sensor configured to sense electromagnetic radiation. The electromagnetic radiation may be (humanly) visible, infrared (IR), or ultraviolet (UV) radiation. The at least one sensor may comprise an array of sensors. For example, the ensemble may comprise an IR sensor array (e.g., a far infrared thermal array such as the one by Melexis). The IR sensor array may have a resolution of at least 32×24 pixels. The IR sensor may be coupled to a digital interface. The ensemble may comprise an IR camera. The ensemble may comprise a sound detector. The ensemble may comprise a microphone. The ensemble may comprise any sensor and/or emitter disclosed herein. The ensemble may include $CO_2$, VOC, temperature, humidity, electromagnetic light, pressure, and/or noise sensors. The sensor may comprise a gesture sensor (e.g., RGB gesture sensor), an acetometer, or a sound sensor. The sounds sensor may comprise an audio decibel level detector. The sensor may comprise a meter driver. The ensemble may include a microphone and/or a processor. The ensemble may comprise a camera (e.g., a 4K pixel camera), a UWB sensor and/or emitter, a Bluetooth (BLE) sensor and/or emitter, a processor. The camera may have any camera resolution disclosed herein. One or more of the components (e.g., sensors) can be integrated on a circuit board and/or chip. The ensemble may be utilized to determine presence of occupants in an enclosure, their number and/or identity (e.g., using the camera). The ensemble may be utilized to control (e.g., monitor and/or adjust) one or more environmental characteristics in the facility (e.g., enclosure) environment. The component disclosed herein includes any component in the ensemble.

In some embodiments, the ensemble (or a group of ensembles) may be utilized to detect characteristics of enclosure occupant(s). For example, the ensemble may be utilized to detect abnormal bodily characteristic of enclosure occupant(s). The abnormal bodily characteristic may comprise bodily temperature, coughing, sneezing, perspiration (e.g., humidity and/or VOCs expulsion), $CO_2$ level. The ensemble(s) may be utilized to locate an absolute and/or relative positioning of enclosure occupant(s). For example, the ensemble(s) may be utilized to measure relative distances between occupants in the enclosure, and/or between occupant(s) and hard and/or dense objects in the enclosure. The hard and/or dense objects may comprise fixtures (e.g., wall, ceiling, floor, window, door, shelf, ceiling light, or wall light) or mobile furniture (e.g., chair, desk, or lamp).

Figure 2:
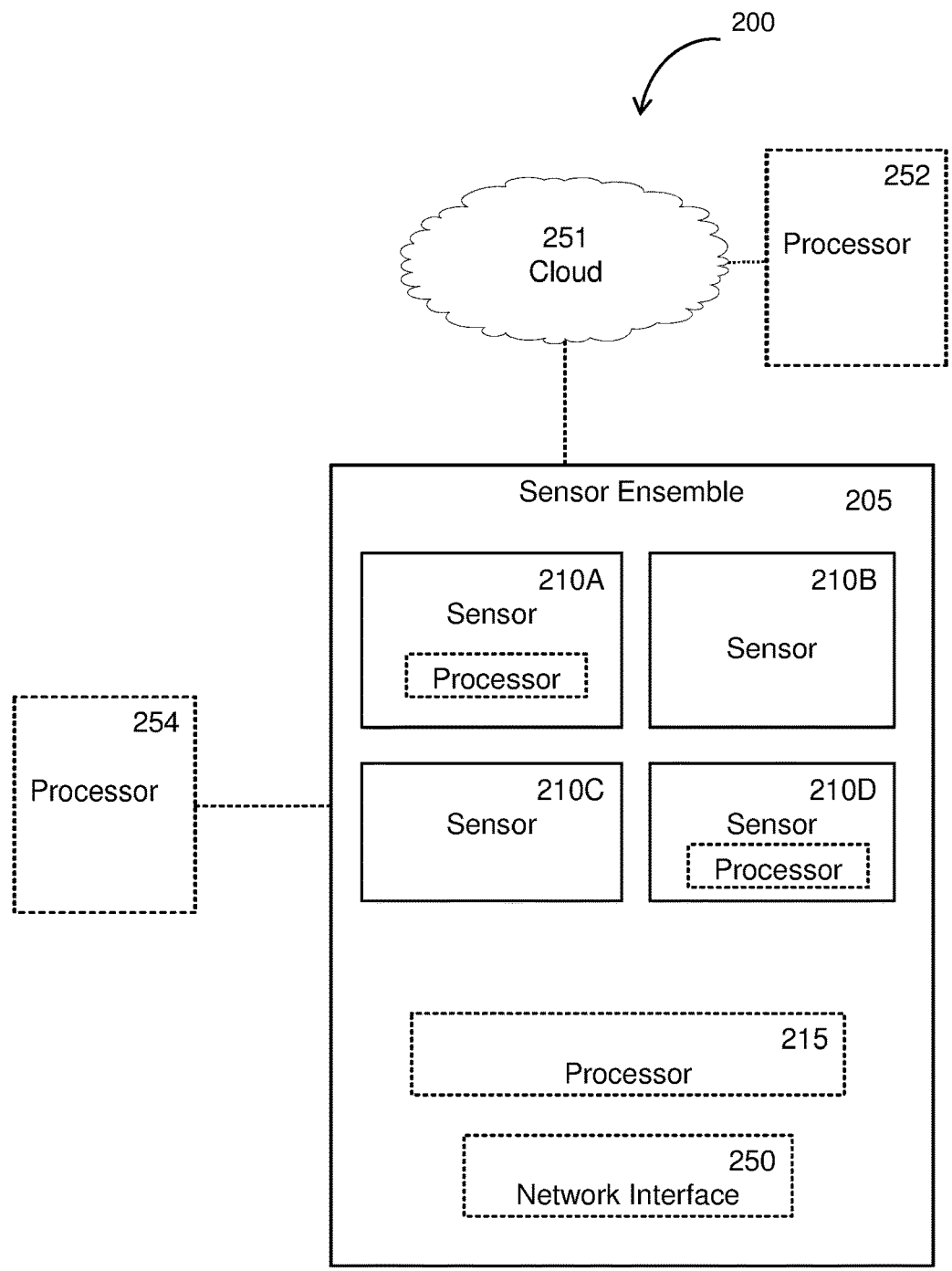
FIG. 2 schematically shows a component ensemble and its connectivity options.

FIG. 2 shows an example of a diagram 200 of an ensemble of components (e.g., sensors) organized into a sensor module. Sensors 210A, 210B, 210C, and 210D are shown as included in sensor ensemble 205. An ensemble of sensors organized into a sensor module may include at least about 1, 2, 4, 5, 8, 10, 20, 50, or 500 sensors. The sensor module may include a number of sensors in a range between any of the aforementioned values (e.g., from about 1 to about 1000, from about 1 to about 500, or from about 500 to about 1000). Sensors of an ensemble may comprise sensors configured or designed for sensing an environmental parameter (e.g., comprising, temperature, humidity, carbon dioxide, particulate matter (e.g., between 2.5 μm and 10 μm), total volatile organic compounds (e.g., via a change in a voltage potential brought about by surface adsorption of volatile organic compound), ambient light, audio noise level, pressure (e.g. gas, and/or liquid), acceleration, time, radar, lidar, radio signals (e.g., ultra-wideband radio signals), passive infrared, glass breakage, or movement). The sensor ensemble (e.g., 205) may comprise non-sensor devices, such as one or more emitters (e.g., buzzers, and/or light emitting diodes). Examples of ensembles and their uses can be found in U.S. patent application Ser. No. 16/447,169 filed Jun. 20, 2019, titled "SENSING AND COMMUNICATIONS UNIT FOR OPTICALLY SWITCHABLE WINDOW SYSTEMS," that is incorporated herein by reference in its entirety.

In some embodiments, an increase in the number and/or types of sensors may be used to increase a probability that one or more measured property is accurate and/or that a particular event measured by one or more sensor has occurred. In some embodiments, sensors of sensor ensemble may cooperate with one another. In an example, a radar sensor of sensor ensemble may determine presence of a number of individuals in a facility. A processor (e.g., processor 215) may determine that detection of presence of a number of individuals in a facility (e.g., an enclosure) is positively correlated with an increase in an environmental attribute such as carbon dioxide concentration. In an example, the processor-accessible memory may determine that an increase in detected infrared energy is positively correlated with an increase in temperature as detected by a temperature sensor. In some embodiments, network interface (e.g., 250) may communicate with other sensor ensembles similar to sensor ensemble. The network interface may communicate with a controller.

Individual sensors (e.g., sensor 210A, sensor 210D, etc.) of an ensemble may comprise and/or utilize at least one dedicated processor. A sensor ensemble may utilize a remote processor (e.g., 254) utilizing a wireless and/or wired communications link. A sensor ensemble may utilize at least one processor (e.g., processor 252), which may represent a cloud-based processor coupled to a sensor ensemble via the cloud (e.g., 250). Processors (e.g., 252 and/or 254) may be located in the same building, in a different building, in a building owned by the same or different entity, a facility owned by the manufacturer of the window/controller/sensor ensemble, or at any other location. In various embodiments, as indicated by the dotted lines of FIG. 2, ensemble 205 is not required to comprise a separate processor and/or network interface. Any of these entities (e.g. processor or cloud) may be separate entities and may be operatively coupled to ensemble 205. The dotted lines in FIG. 2 designate optional feature(s). In some embodiments, onboard processing and/or memory of one or more ensemble of components such as sensors, may be used to support other functions (e.g., via allocation of ensembles(s) memory and/or processing power to the network infrastructure of a building). The other functions may or may not relate to the components of the ensemble.

In some embodiments, a plurality of components (e.g., sensors) of the same type may be distributed in an enclosure. At least one of the plurality of components of the same type, may be part of an ensemble. For example, at least two of the plurality of components of the same type, may be part of at least two ensembles. The ensembles may be distributed in a facility (e.g., an enclosure). An enclosure may comprise a conference room. For example, a plurality of sensors of the same type may measure an environmental parameter in the conference room. Responsive to measurement of the environmental parameter (e.g., environmental attribute) of a facility, a parameter topology of the facility may be generated. A parameter topology may be generated utilizing, e.g., output signals from any type of sensor of the sensor ensemble, e.g., as disclosed herein. Parameter topologies may be generated for any enclosure(s) of a facility such as conference rooms, hallways, bathrooms, cafeterias, garages, auditoriums, utility rooms, storage facilities, equipment rooms, and/or elevators.

In certain embodiments, one or more shortcomings in managing the updating of firmware in device components on the network are overcome by an update scheme that enables recognition of a component among a plurality of (e.g., different) components, its firmware and software version. The update scheme may target relevant updates to at least one component requiring update. In some embodiments, the update scheme uses bidirectional communication between the device components. An update manager may act as a main controller, which manager can reside in the cloud. The bidirectional communication may include (I) communication from the cloud or main-controller to the updatable component (e.g., device), and (II) from the component to the cloud or main-controller, e.g., respectively. In some embodiments, the update module finds an appropriate component to be updated. The update module may then decide what update the component requires. The update module may communicate the required update to the component. The update manager (e.g., of the update module) may provide status reports during the process (e.g., in real-time) and/or after the process. The update module may provide status to the "caller" which invoked the updating. The "caller" may be a requesting party such as a system administrative user in a manually initiated sequence, or an electronic controller (e.g., module) in an automatic update sequence.

In some embodiments, the update manager selectively updates the firmware of one or more components. The one or more components may be of an ensemble. The update manager may be able to update only one component without updating other components in an ensemble and/or in the facility. The other components may include components of the same type and/or components of different types relative to the one component that is subject to the update. The update may take place with or without rebooting the updated component and/or the ensemble. The update of the component may be done during normal operation of the components. The overall update scheme may be similar to a repeated spiderweb update scheme. For example, there are (1) components (e.g., devices) of different types coupled to the network, (2) some ensembles may have many components, (3) some components may have different instances (e.g., several components of the same type) within the plurality of components, while others do not, and (4) the different instances of the same component may have different versions of the software. The update manager may be configured to adapt to different facilities having different component (e.g., device) collections, e.g., to efficiently accomplish updating of the components. Since the separate component types may include components (e.g., devices) from different device manufacturers, the available firmware or software updates may likewise come from a plurality of sources. A network administrator (e.g., a quality assurance group working on behalf of the administrator) may verify and/or test updates for compatibility in the context of a particular network, e.g., before releasing them for installation into the components (e.g., devices) operating in the (e.g., local) network.

In some embodiments, the updatable components (e.g., each) include an update engine. The update engine may be a software and/or firmware component which is responsive to an update protocol used by the update manager. The protocol may enable the update manager to act as an intermediary between an updatable component and a source of (e.g., validated) update. The update manager may make decision(s) regarding when to initiate and/or proceed with a particular update. In some embodiments, the update manager is located within an on-premises network. In some embodiments, the update manager is located locally in the facility housing the component(s). In some embodiments, the update manager is located remotely from the facility housing the component(s). For example, the update manager may be in a cloud server and/or cloud network (e.g., under control of a service provider, network provider, and/or manufacturer). The manufacturer may be of the network, or of components thereof. A backend application (e.g., on the remote and/or cloud network) may coordinate authentication of resources making access from a local (e.g., facility such as a building) network and may compile a database which lists (i) all the updatable components (e.g., devices) in the local network, (ii) the current level or version of firmware or software running on the components (e.g., devices), and/or (iii) images of validated updates and the components (e.g., devices) to which they pertain. The backend application may recognize (1) the components (e.g., devices) and corresponding software and/or firmware versions executing on the components, and (2) target the components (e.g., devices) for updating, e.g., by distributing relevant ones of the firmware and/or software updates to replace the versions executing on the components, e.g., via the update manager. The database may be partially or completely contained in the local network (e.g., alongside the update manager), or operatively coupled thereto. For example, the database may be accessed by utilizing the local network. Access may be by the update manager and/or by the component. Instead of or in addition to the backend application, a controller and/or dashboard may be operatively coupled to the local network, e.g., for enabling an administrative user (ii) to monitor any available update(s) and/or (ii) to select a time to perform the distribution and installation of updates to any particular updatable device. The administrative user may be animate (e.g., human) or inanimate (e.g., automated such as by utilizing a program, e.g., embedded in software or firmware). The inanimate user may comprise a machine (e.g., a robot).

Figure 3:
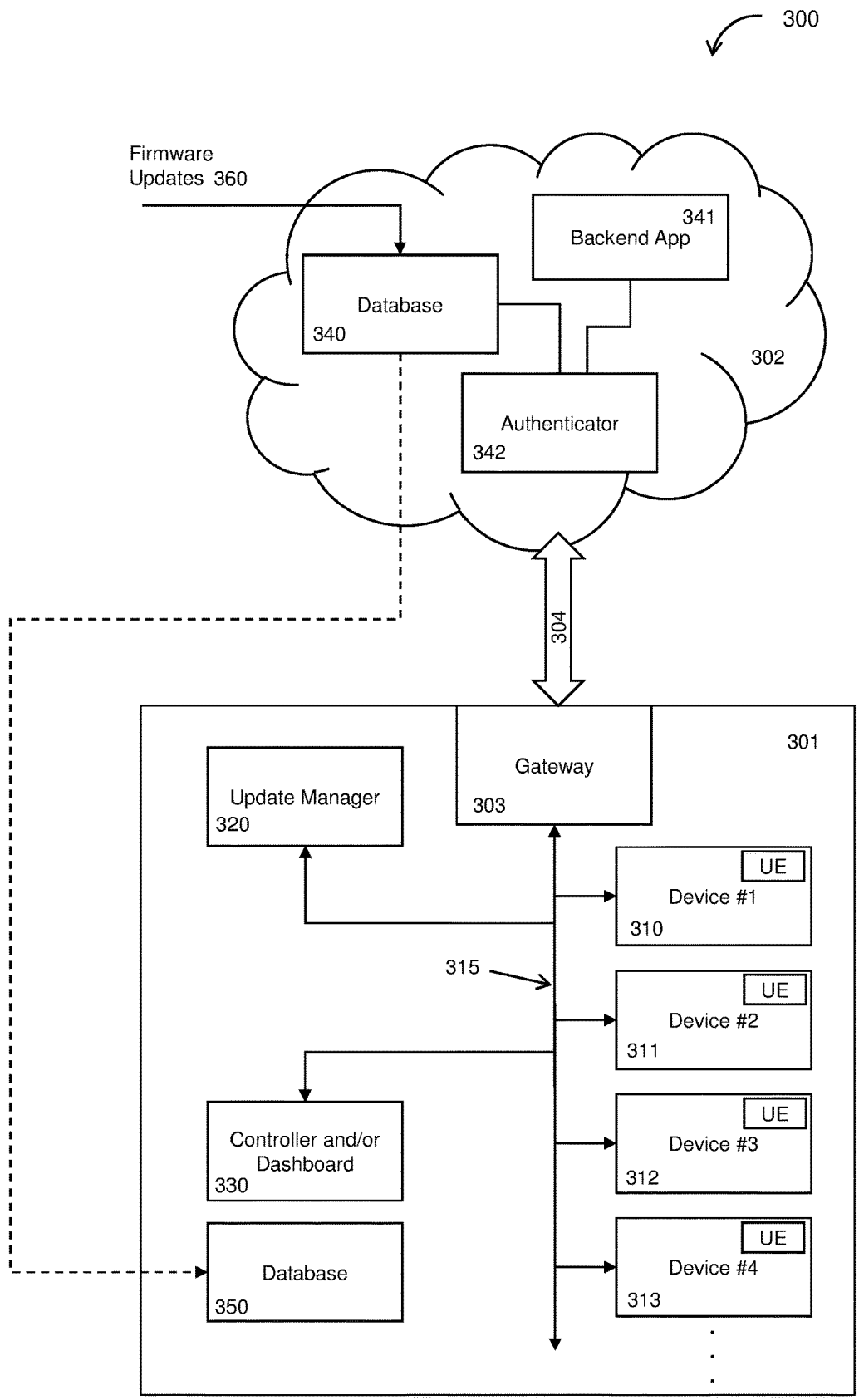
FIG. 3 schematically shows a network for updating components (e.g., devices)

FIG. 3 shows an example of a network system 300 in which a local (e.g., facility such as a building) network 301 communicates with a cloud system 302 via a gateway 303 and transport link 304. Local network 301 contains a plurality of updatable components that are devices (which may or may not reside in a respective ensemble), including a first device 310, a second device 311, a third device 312, a fourth device 313, and more. A local network link 315 interconnects components including devices 310-313 with a firmware update manager 320, a controller and/or dashboard 330, and a database 350. Controller and/or dashboard 330 may be implemented as part of a control system. For example, as part of a hierarchical control system (e.g., in a main controller of the hierarchical control system). Relevant assets within cloud system 302 include a backend app 341 and an authenticator 342. In some embodiments, backend app 341 provides a control and/or dashboard function instead of, or together with, controller and/or dashboard 330. Authenticator 342 may restrict operation to authorized user(s) using security credential(s) and/or protocol(s). Examples of security protocols, their usage, a multi component network and its operation, e.g., control, can be found in U.S. Provisional Patent Application Ser. No. 63/121,561 filed Dec. 4, 2020 titled "ACCESS AND MESSAGING IN A MULTI CLIENT NETWORK," which is incorporated herein by reference in its entirety.

In some embodiments, a component operatively coupled to a local network requires an update. A manufacturer and/or developer of an updatable device component may publish or otherwise disseminate updates to revise the firmware or software, e.g., in the normal course of business. A consumer of the updatable component potentially interested in the updates may review and/or test (e.g., validate) the available updates. The consumer may compile the tested and/or validated updates, e.g., as a library in a remote database (e.g., 340) and/or local database (e.g., 350). The consumer may include a network system assembler, administrator, operator, manufacturer, and/or a system provider. Compilation of the tested and/or validated update(s) may include storing an image of the (e.g., each) update that can be transferred to an update engine (UE) of the component (e.g., in devices 310-313). The update engine may install the update(s), e.g., following the testing, validation, and/or receipt of the update image. Compiled in local database and/or remote database may be the listing of updatable components (e.g., devices). The local and/or remote database may list also the component type, grouping to any ensembles, component version, current software or firmware version. The database can be used by the user (e.g., an administrator) to select a target time for processing and/or installing the update(s) on one or more corresponding components. The user may enter their selection(s) (I) one-by-one for individual components (e.g., individually), (II) according to groups of components. The groups may be of components of the same type, of the same version, of the same housing (e.g., in the same ensemble), of the same facility section (e.g., the same floor or of the same building), and/or having a common group software or firmware version. At least two of a plurality of components may be update sequentially or concurrently. Concurrent update can include an update process of at least two components having at least one portion of time overlap. The at least two components can be updated with the same update, or with different updates. Sequential updates can occur when the update process of at least two components have no time overlap. In a sequential update, a second update can directly follow a first update (e.g., without any (e.g., measurable)) time gap, or indirectly follow a first update (e.g., having a measurable time gap between the first and the second update).

In some embodiments, the update is programmed. Programming of (i) backend application (e.g., 341), (ii) controller and/or dashboard (e.g., 330), and/or (iii) update manager (e.g., 320), may automatically launch the updating process for individual component or component groups, e.g., without further human intervention. The Update manager (e.g., 320) may be comprised of a server, such as an IoTium server or iNode (available from IoTium, Inc., Santa Clara, California), which synchronizes with a cloud controller (e.g., backend app 341) and/or controller (e.g., 330) that is a disposed in the facility. The upgrade manager may arbitrate message(s) on the local network links (e.g., 315), e.g., according to an updating protocol.

In some embodiments, an incoming component for update and/or messaging is communicatively coupled to the local network. An incoming component (e.g., device) may utilize a network authentication protocol. The network authentication protocol may open one or more ports for network access. The port(s) may be opened when an organization and/or a facility authenticates (e.g., through network authentication) an identity of an incoming component that attempts to operatively couple (e.g., communicatively and/or physically couples) to the local network. The network administrator (e.g., organization and/or facility) may authorize (e.g., using the network) access of the incoming component (e.g., device and/or module) to the network. The access may or may not be restricted (e.g., to various portions of the network). The restriction may comprise one or more security levels. The identity of the incoming component can be determined based at least in part on the credentials and/or certificate carried by the incoming component. The credentials and/or certificate may be confirmed by the local network (e.g., by a server operatively coupled to the local network). The authentication protocol may or may not be specific for communication (e.g., physical communication such as using Ethernet communication) in a local area network (LAN), e.g., that utilizes packets. The standard may be maintained by the Institute of Electrical and Electronics Engineers (IEEE). The standard may specify the physical media (e.g., target apparatus) and/or the working characteristics of the network (e.g., Ethernet). The networking standard may support virtual LANs (VLANs) on a local area (e.g., Ethernet) network. The standard may support power over local area network (e.g., Ethernet). The network may provide communication over power line (e.g., coaxial cable). The power may be direct current (DC) power. The power may be at least about 12 Watts (W), 15 W, 25 W, 30 W, 40 W, 48 W, 50 W, or 100 W. The standard may facilitate mesh networking. The standard may facilitate a local area network (LAN) technology and/or wide area network (WAN) applications. The standard may facilitate physical connections between target apparatuses and/or infrastructure devices (hubs, switches, routers) by various types of cables (e.g., coaxial, twisted wires, copper cables, and/or fiber cables). Examples of network authentication protocols can be 802.1X, or KERBEROS. The network authentication protocol may comprise secret-key cryptography. The network can support (e.g., communication) protocols comprising 802.3, 802.3af (PoE), 802.3at (PoE+), 802.1Q, or 802.11s. The network may support a communication protocol for Building Automation and Control (BAC) networks (e.g., BACnet). The protocol may define service(s) used to communicate between building devices. The protocol services may include device and object discovery (e.g., Who-Is, I-Am, Who-Has, and/or I-Have). The protocol services may include Read-Property and Write-Property (e.g., for data sharing). The network protocol may define object types (e.g., that are acted upon by the services). The protocol may define one or more data links/physical layers (e.g., ARCNET, Ethernet, BACnet/IP, BACnet/IPv6, BACnet/MSTP, Point-To-Point over RS-232, Master-Slave/Token-Passing over RS-485, ZigBee, and/or LonTalk). The protocol may be dedicated to devices (e.g., Internet of Things (IoT) devices and/or machine to machine (M2M) communication). The protocol may be a messaging protocol. The protocol may be a publish—subscribe protocol. The protocol may be configured for messaging transport. The protocol may be configured for remote devices. The protocol may be configured for devices having a small code footprint and/or minimal network bandwidth. The small code footprint may be configured to be handled by microcontrollers. The protocol may have a plurality of quality of service levels including (i) at most once, (ii) at least once, and/or (iii) exactly once. The plurality of quality of service levels may increase reliability of the message delivery in the network (e.g., to the target of the message). The protocol may facilitate messaging (i) between device to cloud and/or (ii) between cloud to device. The messaging protocol is configured for broadcasting messages to groups of target component such as target apparatuses (e.g., devices), sensors, and/or emitters. The protocol may comply with Organization for the Advancement of Structured Information Standards (OASIS). The protocol may support security schemes such as authentication (e.g., using tokens). The protocol may support access delegation standard (e.g., OAuth). The protocol may support granting a first application (and/or website) access to information on a second application (and/or website) without providing the second with a security code (e.g., token and/or password) relating to the first application. The protocol may be a next generation home networking protocol (abbreviated herein as "G.hn" protocol). The protocol may be a Message Queuing Telemetry Transport (MQTT) or Advanced Message Queuing Protocol (AMQP) protocol. The protocol may be configured for a message rate of at least one (1) message per second per publisher. The protocol may be configured to facilitate a message payload size of at most 64, 86, 96, or 128 bytes. The protocol may be configured to communicate with any device (e.g., from a microcontroller to a server) that operates a protocol compliant (e.g., MQTT) library and/or connects to compliant broker (e.g., MQTT broker) over a network. Each device (e.g., target apparatus, sensor, or emitter) can be a publisher and/or a subscriber. A broker can handle millions of concurrently connected devices, or less than millions. The broker can handle at least about 100, 10000, 100000, 1000000, or 10000000 concurrently connected devices. In some embodiments, the broker is responsible for receiving (e.g., all) messages, filtering the messages, determining who is interested in each message, and/or sending the message to these subscribed device (e.g., broker client). The protocol may require internet connectivity to the network. The protocol may facilitate bi-directional, and/or synchronous peer-to-peer messaging. The protocol may be a binary wire protocol. The security scheme of the local network may comprise a plurality of brokers. For example, a commissioning broker that restricts access of the incoming component to the network, verifies authentication of the incoming component, and grants access to the data broker; and a data broker that verifies the granted access given to the incoming component by the commissioning broker, and provides a short lived access permission to the incoming component to access the local network. The short lived period may be encompassed in the granted access by the commissioning broker to the data broker and/or in the permission given by the data broker to the incoming component. Examples of such network protocol, control system, brokers, and network can be found in U.S. Provisional Patent Application Ser. No. 63/121,561 filed Dec. 4, 2020 titled "ACCESS AND MESSAGING IN A MULTI CLIENT NETWORK," which is incorporated herein by reference in its entirety. Examples of network security, communication standards, communication interface, messaging, coupling of devices to the network, brokers, and control can be found in U.S. provisional patent application Ser. No. 63/121,561, and in PCT patent application serial number PCT/US20/70123 filed Jun. 4, 2020, titled "SECURE BUILDING SERVICES NETWORK," each of which is incorporated herein by reference in its entirety.

In some embodiments, the network comprises cabling. The cabling may facilitate transmission of power and/or communication. The cabling may comprise ethernet cabling (e.g., CAT5e ethernet cable). The cabling may include twisted wires, optical wires, and/or coaxial cable. The controller may comprise Multimedia over Coax Alliance (abbreviated herein as "MoCA") front-end controller (e.g., MoCA front-end integrated circuits).

In some embodiments, the control system is arranged as a hierarchical network with a main controller (MC), intermediate network or floor controllers (NC), and local (e.g., window) controllers (WC). The controllers (e.g., NCs or the MC) may be communicatively coupled (e.g., connected) to various components such as sensors (e.g., light, temperature, or occupancy sensors) within the facility. The components may include (e.g., light and/or temperature) sensors positioned on, around, or otherwise external to the facility (for example, on a roof of the building or of a vehicle). In some embodiments, the control system (e.g., the NCs or the WCs) may also transmit status and/or sensor data (e.g., directly). In some embodiments, the control system (e.g., the MC therein) can communicate via an application programming interface (API). In some embodiments, automation service, such as a BMS, can communicate via an application programming interface (API). The automation service may be integral or separate to the control system. The API can execute in conjunction with a (e.g., master) controller application (or platform) within the controller (e.g., MC), and/or in conjunction with a building management application (or platform) within the BMS. The controller (e.g., MC) and/or the BMS can communicate over one or more wireless and/or wired links. The communication may be via an outward-facing network external to the facility.

In some embodiments, controller collectively refers to any suitable combination of hardware, firmware and/or software for implementing the functions, operations, processes, or capabilities described herein. For example, the controller (e.g., master controller) can refer to a computer that implements a (e.g., master) controller application (also referred to herein as a "program" or a "task"). For example, the controller may include one or more processors. The processor(s) can be or can include a central processing unit (CPU), such as a single core or a multi-core processor. The processor may be a graphic processor (e.g., GPU). The controller may include a microcontroller. The processor can additionally include a digital signal processor (DSP) or a network processor in some examples. The processor could also include one or more application-specific integrated circuits (ASICs). The processor may be coupled with a primary memory, a secondary memory, an inward-facing network interface, and an outward-facing network interface. The primary memory can include one or more high-speed memory devices such as, for example, one or more random-access memory (RAM) devices including dynamic-RAM (DRAM) devices. Such DRAM devices can include, for example, synchronous DRAM (SDRAM) devices, double data rate SDRAM (DDR SDRAM) device (including DDR2 SDRAM, DDR3 SDRAM, and/or DDR4 SDRAM), thyristor RAM (T-RAM), and/or zero-capacitor (Z-RAM®), among other suitable memory devices.

In some embodiments, the secondary memory can include one or more hard disk drives (HDDs) or one or more solid-state drives (SSDs). In some embodiments, the memory can store processor-executable code (or "programming instructions") for implementing a multi-tasking operating system such as, for example, an operating system based at least in part on a Linux® kernel. The processor may include a single or multiple kernels. The operating system can be a UNIX®- or Unix-like-based operating system, a Microsoft Windows®-based operating system, or another suitable operating system. The memory may store code executable by the processor to implement the master controller application described above, as well as code for implementing other applications or programs. The memory may store status information, sensor data, time stamps, and/or other data collected from network controllers and/or any other component coupled thereto (e.g., window controllers, media displays, emitters, sensors, and/or any other component disclosed herein).

In some embodiments, the update protocol within the processing system involves three successive phases including Deployment, Handshake/Transfer, and Install phases. The Deployment phase may be comprised of the facility controller maintaining component information (e.g., in a database), and optionally along with update information (e.g., including update version and/or update timestamp) and/or update images. For example, firmware and/or software update images that have been validated may be parsed (e.g., automatically parsed) and populated in an image library, e.g., in preparation for installation. Deployment may include automatic and/or manual decision making, e.g., to determine an appropriate time for launching the installation of update images for targeted components (e.g., devices). Using a dashboard, for example, an administrative user may access device information, such as by retrieving a previously populated list of components (e.g., devices) for which an updated firmware and/or software version is available (e.g., including a model, component, component grouping (e.g., into ensembles), and/or version information). A user may select an update tab on a dashboard display, e.g., to check for validated updates that have been authorized for respective components listed in the database. A dashboard application may provide suggested upgrade paths for one or more components (e.g., where one update has implications for operations with other interacting components that may need their own updating). In some embodiments, the administrative user may initiate downloading of an update (e.g., update image) which is not locally stored. In some embodiments, a user is automatically prompted with a request for authorizing an update. In some embodiments, an update is launched automatically without needing any user approval (e.g., according to previously selected preferences).

In some embodiments, when the updating of a particular updatable component has been (manually or automatically) targeted, the firmware update manager is commanded (e.g., by the controller and/or dashboard) to proceed with the update protocol for the targeted components(s) (e.g., in the Handshake/Transfer phase). In the Handshake/Transfer phase, the firmware update manager can conduct a separate transaction with each targeted component which begins with a handshake message and reply. The handshake may provide an exchange of component information and/or metadata (e.g., size) for an update (e.g., update image) file. The handshake may initialize the update engine (e.g., an over the air (OTA) type of message). For example, to prepare for and then accept transfer of the update file. Following the transfer, the Handshake/Transfer phase may include an acknowledgement of a successful transfer. In some embodiments, the protocol proceeds (e.g., after the acknowledgement) to the update installation phase in which the firmware update manager instructs the targeted component to install the update file. During update, the targeted component may send regular progress messages (e.g., once per two minutes, or more frequently) to the update manager, e.g., so that faults during installation can be detected. Upon successful completion of an installation, the targeted component may send a confirmation message to the update manager. The confirmation can include details on the new version status of the component. The message can be relayed to the database and/or the dashboard.

Figure 4:
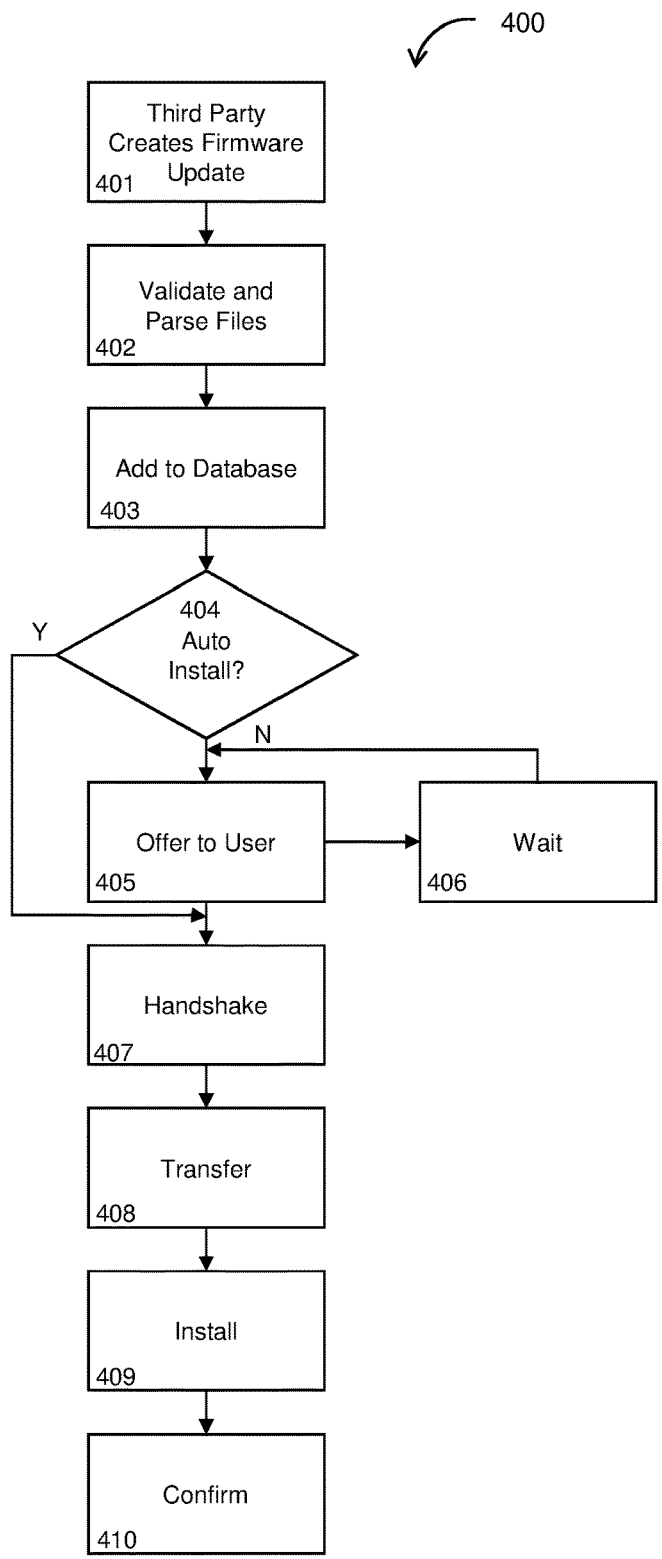
FIG. 4 shows a flowchart for managing and distributing updates.

FIG. 4 shows an example of a flowchart for updating firmware of targeted devices. At block 401, firmware updates are created to upgrade operation of a component, e.g., created by a third party such as the developer or fabricator of a component. An administrator or service provider for the component validates the updates (e.g., using a Quality Assurance group), and the validated update files are parsed for integration at block 402, and are then added to the update database at block 403. At operation 404 it is determined whether a newly added update should be (e.g., automatically) installed. If not, then the update may be placed into a queue or other populated list for presentation to a user as an available update at operation 405. If a user consults the list but decides at 406 to defer installation to a later time, then the list is maintained and will be presented again later at 405. The user may optionally select a target time to install the update (not shown). When an update is to be installed (e.g., manually) or when the user chooses to proceed, then the firmware update manager is prompted to perform a handshake at operation 407. After a successful handshake, the update (e.g., update image) file is transferred at operation 408 and installed at operation 409. Following successful installation of the update, the targeted device confirms the installation at operation 410. One or more of operations 407-410 may be performed between the firmware update manager and an individual targeted component to be updated independently or in concert with one or more components. Concerted action may include sequential or concurrent action, e.g., as disclosed herein. Operations 407-410 may be performed multiple times (e.g., concurrently or serially) by the firmware update manager in transactions with one or more components, e.g., as described herein.

In some embodiments, the firmware update manager runs on a controller operating as an iNode within the network interconnecting the target components. The update manager may operate according to scripted commands (e.g., using a Python script) defining the handshake, transfer, and install portions of the update process. When executing the scripts, the firmware update manager may collect ACKS (acknowledgements) and/or NACKS (negative acknowledgements) for various messages and operations. For example, once the update manager receives a (e.g., an over the air (OTA)) message, a script 'localFwUpdate.py' may kick off subprocesses for (1) synchronizing up device information, e.g., in order to verify the correct choice of update image file, (2) transferring the update (e.g., update image) file, and/or (3) instructing the component (e.g., device) to install the update file. In the initial handshake, the (e.g., firmware) update manager and targeted component for update may exchange data such as a hardware version, firmware and/or software version, update image file size, and/or a maximum chunk size for the transfer. The update engine in the targeted component may be initialized with data, e.g., including a number of chunks to be transferred and/or file checksum information. During transfer of an update file, the update manager may request verification of receipt of file chunks. An attempted transfer may be discontinued and restarted, e.g., if a request for verification does not receive an acknowledgment, receives a rejection, or otherwise failed. After full transfer of the update file is verified, the update manager may send an install command to the target component (e.g., device or software) according to a corresponding script, e.g., which may direct the targeted component to send progress message(s) during the local installation process and a final confirmation message once completed.

Figure 5:
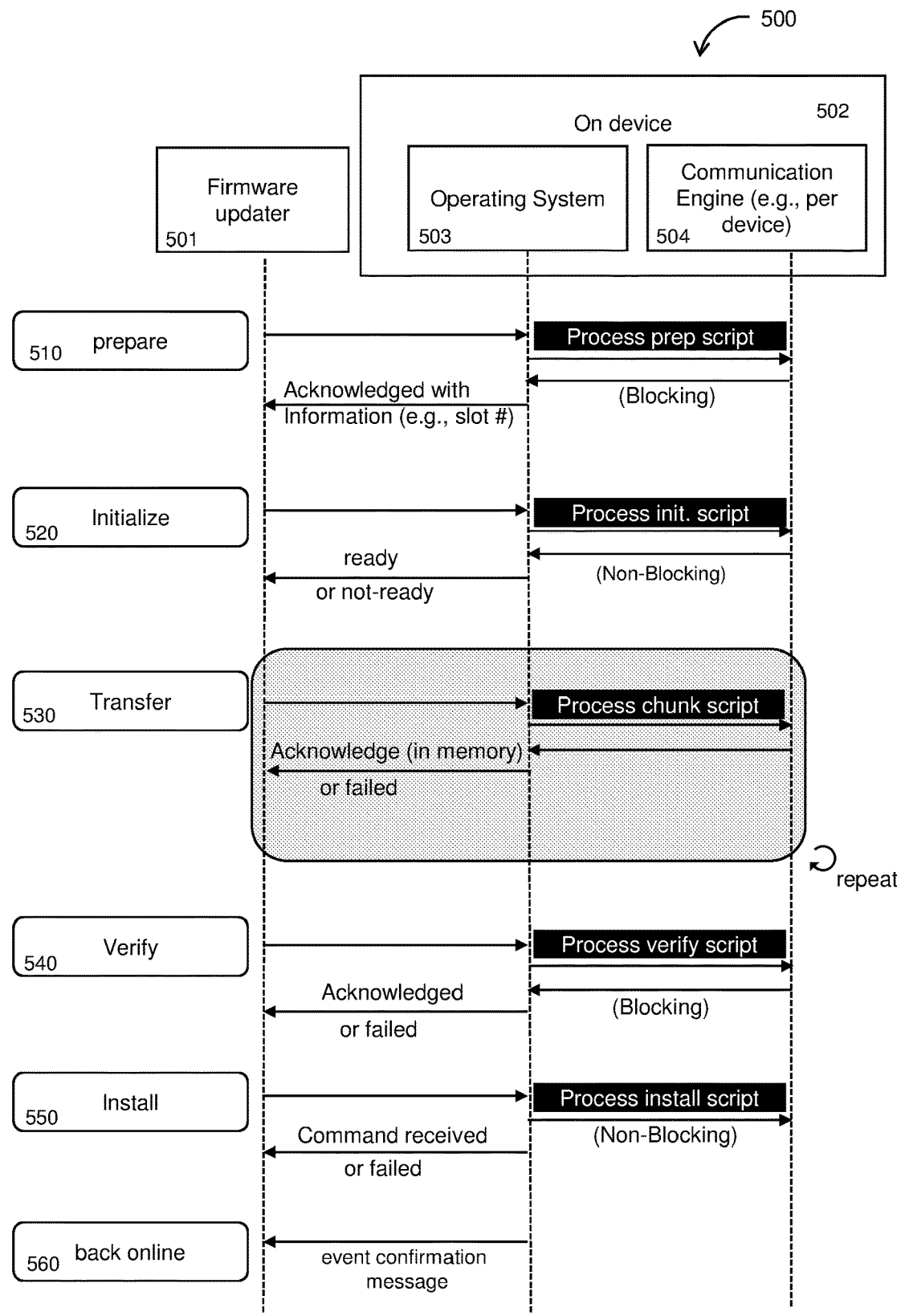
FIG. 5 schematically shows a sequence of operations between a firmware update manager and a target device.

FIG. 5 shows an example of transactions 500 between firmware (FW) updater (e.g., firmware update manager) 501 and targeted device 502. Device 502 includes an operating system 503 and an update/communication engine 504 (e.g., of which there is one on each device to be targeted for updating). The protocol for updating the device firmware includes a Prepare operation 510 in which FW updater 501 send the handshake message causing device 502 to execute a preparation script. An acknowledgement (ACK) returned to FW updater 501 may include a slot number to receive a transfer. Further within the Handshake phase, an Initialize operation 520 is performed in which FW updater 501 sends an initialize message causing device 502 to execute an initialization script. If engine 504 is initialized and ready for transfer, then an ACK may be sent to FW updater 501 to indicate readiness. If engine 504 is not successfully initialized, then a NACK message may be sent to FW updater 501 to indicate lack of readiness. Once the readiness has been acknowledged, a Transfer operation 530 is performed in which FW updater 501 commands device 502 to execute a chunk script in which chunks of the update image file are sent in succession. With each chunk successfully stored in flash memory or not within device 502, a corresponding ACK (success) or NACK (failure) message may be sent to FW updater 501. After file transfer, a Verify operation 540 is performed in which FW updater 501 commands device 502 to execute a verify script (e.g., using checksum(s) to test validity of the received file). If verification is acknowledged, an Install operation 550 is performed in which FW updater 501 commands device 502 to execute an install script in which the update image file is installed under direction of engine 504. Device 502 may acknowledge receipt of the install command as well as progress messages during installation. Upon successful installation of the update image, a confirmation message may be sent by device 502 indicating to FW updater 501 that device 502 is back online at 560. The device may be an ensemble comprising a plurality of components. For example, the device may be an ensemble comprising a microcontroller, circuit board, a sensor, or an emitter. The ensemble may comprise a plurality of circuitry boards. The plurality of circuit boards may comprise a GPU, CPU, or microcontroller. The plurality of circuit boards by be disposed relative to each other to facilitate heat exchange. There may be at least one thermal wall (heat shield) and/or thermal absorber (heat sink) in the ensemble housing. The device may be a component type (e.g., a sensor or an emitter). In some embodiments, the ensemble comprises a processing unit. The processing unit may comprise circuitry, memory, and be configured for processing capabilities. The device ensemble may comprise a plurality of circuit boards. At least two of the plurality of circuit boards may be disposed (e.g., substantially) parallel to each other (e.g., in the ensemble housing). At least two of the plurality of circuit boards may be disposed (e.g., substantially) in the same plane. At least two of the plurality of circuit boards may be disposed (e.g., substantially) in different planes. At least two of the plurality of circuit boards may be disposed (e.g., directly) adjacent to each other. Directly adjacent to each other excludes an intervening circuit board. At least two of the plurality of circuit boards may be disposed to allow shielding element, cooling element, and/or gas to flow therebetween. Examples of ensemble, their components, control methodology, connectivity to the network, operations, and the local network, can be found in Provisional Patent Application Ser. No. 63/079,851 filed on Sep. 17, 2020, titled "DEVICE ENSEMBLES AND COEXISTENCE MANAGEMENT OF DEVICES," which is incorporated herein by reference in its entirety.

Once a target component and/or target ensemble of components is updated, it may be used to distribute the update file (and/or direct the updating process of) other similar components or component ensembles that are operatively coupled to the network. For example, a device ensemble or interconnected device ensembles may include a local controller/processor and a plurality of components that use the same firmware. For example, a device ensemble may comprise a Kinetis K63F controller having a 120 MHz ARM® Cortex®-M4-based Microcontroller with FPU. The local controller may update some or all of the components based on information obtained from the update manager and or update database on the network. In some embodiments, a first updated component or component ensembles can update at least one second component or component ensemble across (e.g., respectively) the local network (e.g., with or without being confined to a certain groupings such as a component ensemble grouping).

The controller may monitor and/or direct (e.g., physical) alteration of the operating conditions of the apparatuses, software, and/or methods described herein. Control may comprise regulate, manipulate, restrict, direct, monitor, adjust, modulate, vary, alter, restrain, check, guide, or manage. Controlled (e.g., by a controller) may include attenuated, modulated, varied, managed, curbed, disciplined, regulated, restrained, supervised, manipulated, and/or guided. The control may comprise controlling a control variable (e.g. temperature, power, voltage, and/or profile). The control can comprise real time or off-line control. A calculation utilized by the controller can be done in real time, and/or off-line. The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from at least one sensor). The controller may deliver an output. The controller may comprise multiple (e.g., sub-) controllers. The controller may be a part of a control system. The control system may comprise a master controller, floor controller, local controller (e.g., enclosure controller, or window controller). The controller may receive one or more inputs. The controller may generate one or more outputs. The controller may be a single input single output controller (SISO) or a multiple input multiple output controller (MIMO). The controller may interpret the input signal received. The controller may acquire data from the one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise (or operatively coupled to) a keyboard, keypad, mouse, touch screen, microphone, speech recognition package, camera, imaging system, or any combination thereof. The outputs may include a display (e.g., screen), speaker, or printer.

The methods, systems and/or the apparatus described herein may comprise a control system. The control system can be in communication with any of the apparatuses (e.g., sensors) described herein. The sensors may be of the same type or of different types, e.g., as described herein. For example, the control system may be in communication with the first sensor and/or with the second sensor. The control system may control the one or more sensors. The control system may control one or more components of a building management system (e.g., lightening, security, and/or air conditioning system). The controller may regulate at least one (e.g., environmental) characteristic of the enclosure. The control system may regulate the enclosure environment using any component of the building management system. For example, the control system may regulate the energy supplied by a heating element and/or by a cooling element. For example, the control system may regulate velocity of an air flowing through a vent to and/or from the enclosure. The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "GPU"). The controller(s) or control mechanisms (e.g., comprising a computer system) may be programmed to implement one or more methods of the disclosure. The processor may be programmed to implement methods of the disclosure. The controller may control at least one component of the forming systems and/or apparatuses disclosed herein.

Figure 6:
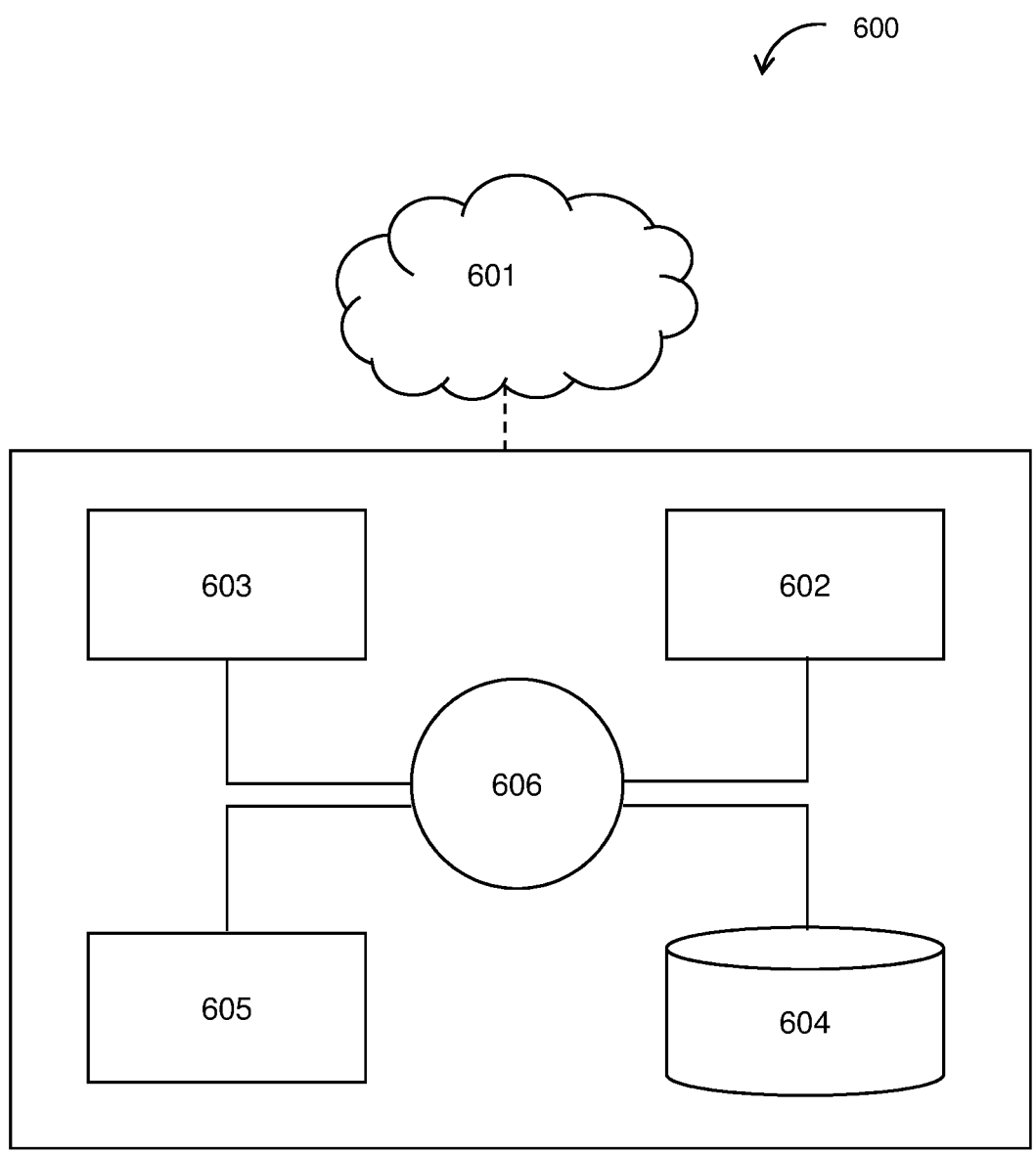
FIG. 6 schematically depicts a processing system.

FIG. 6 shows a schematic example of a computer system 600 that is programmed or otherwise configured to one or more operations of any of the methods provided herein. The computer system can control (e.g., direct, monitor, and/or regulate) various features of the methods, apparatuses and systems of the present disclosure, such as, for example, control heating, cooling, lightening, and/or venting of an enclosure, or any combination thereof. The computer system can be part of, or be in communication with, any sensor or sensor ensemble disclosed herein. The computer may be coupled to one or more mechanisms disclosed herein, and/or any parts thereof. For example, the computer may be coupled to one or more sensors, valves, switches, lights, windows (e.g., IGUs), motors, pumps, optical components, or any combination thereof.

The computer system can include a processing unit (e.g., 606) (also "processor," "computer" and "computer processor" used herein). The computer system may include memory or memory location (e.g., 602) (e.g., random-access memory, read-only memory, flash memory), electronic storage unit (e.g., 604) (e.g., hard disk), communication interface (e.g., 603) (e.g., network adapter) for communicating with one or more other systems, and peripheral components (e.g., 605), such as cache, other memory, data storage and/or electronic display adapters. In the example shown in FIG. 6, the memory 602, storage unit 604, interface 603, and peripheral components 605 are in communication with the processing unit 606 through a communication bus (solid lines), such as a motherboard. The storage unit can be a data storage unit (or data repository) for storing data. The computer system can be operatively coupled to a computer network ("network") (e.g., 601) with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable components (e.g., devices) coupled to the computer system to behave as a client or a server.

The processing unit can execute a sequence of machine-readable instructions, which can be embodied in a program or software. The instructions may be stored in a memory location, such as the memory 602. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 600 can be included in the circuit.

The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 602 or electronic storage unit 604. The machine executable or machine-readable code can be provided in the form of software. During use, the processor 606 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code or can be compiled during runtime. The code can be supplied in a programming language that can be selected to enable the code to execute in a pre-compiled or as-compiled fashion.

In some embodiments, the processor comprises a code. The code can be program instructions. The program instructions may cause the at least one processor (e.g., computer) to direct a feed forward and/or feedback control loop. In some embodiments, the program instructions cause the at least one processor to direct a closed loop and/or open loop control scheme. The control may be based at least in part on one or more sensor readings (e.g., sensor data). One controller may direct a plurality of operations. At least two operations may be directed by different controllers. In some embodiments, a different controller may direct at least two of operations (a), (b) and (c). In some embodiments, different controllers may direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). The controller and/or computer readable media may direct any of the apparatuses or components thereof disclosed herein. The controller and/or computer readable media may direct any operations of the methods disclosed herein.

In some embodiments, the at least one sensor is operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may include temperature sensor, weight sensor, material (e.g., powder) level sensor, metrology sensor, gas sensor, or humidity sensor. The metrology sensor may comprise measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, or electromagnetic signal. The electromagnetic signal may comprise a visible, infrared, ultraviolet, ultrasound, radio wave, or microwave signal. The gas sensor may sense any of the gas delineated herein. The distance sensor can be a type of metrology sensor. The distance sensor may comprise an optical sensor, or capacitance sensor. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The temperature sensor may comprise a camera (e.g., IR camera, CCD camera). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensor, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The one or more sensors may be connected to a control system (e.g., to a processor, to a computer).

In various embodiments, a network infrastructure supports a control system for one or more windows such as tintable (e.g., electrochromic) windows. The control system may comprise one or more controllers operatively coupled (e.g., directly or indirectly) to one or more windows. While the disclosed embodiments describe tintable windows (also referred to herein as "optically switchable windows," or "smart windows") such as electrochromic windows, the concepts disclosed herein may apply to other types of switchable optical devices comprising a liquid crystal device, an electrochromic device, suspended particle device (SPD), NanoChromics display (NCD), Organic electroluminescent display (OELD), suspended particle device (SPD), NanoChromics display (NCD), or an Organic electroluminescent display (OELD). The display element may be attached to a part of a transparent body (such as the windows). The tintable window may be disposed in a (non-transitory) facility such as a building, and/or in a transitory facility (e.g., vehicle) such as a car, RV, buss, train, airplane, helicopter, ship, or boat.

In some embodiments, a tintable window exhibits a (e.g., controllable and/or reversible) change in at least one optical property of the window, e.g., when a stimulus is applied. The optical property may comprise hue, or transmissivity. The hue may comprise color. The transmissivity may be of one or more wavelengths. The wavelengths may comprise ultraviolet, visible, or infrared wavelengths. The stimulus can include an optical, electrical and/or magnetic stimulus. For example, the stimulus can include an applied voltage and/or current. One or more tintable windows can be used to control lighting and/or glare conditions, e.g., by regulating the transmission of solar energy propagating through them. One or more tintable windows can be used to control a temperature within a building, e.g., by regulating the transmission of solar energy propagating through the window. Control of the solar energy may control heat load imposed on the interior of the facility (e.g., building). The control may be manual and/or automatic. The control may be used for maintaining one or more requested (e.g., environmental) conditions, e.g., occupant comfort. The control may include reducing energy consumption of a heating, ventilation, air conditioning and/or lighting systems. At least two of heating, ventilation, and air conditioning may be induced by separate systems. At least two of heating, ventilation, and air conditioning may be induced by one system. The heating, ventilation, and air conditioning may be induced by a single system (abbreviated herein as "HVAC). In some cases, tintable windows may be responsive to (e.g., and communicatively coupled to) one or more environmental sensors and/or user control. Tintable windows may comprise (e.g., may be) electrochromic windows. The windows may be located in the range from the interior to the exterior of a structure (e.g., facility, e.g., building). However, this need not be the case. Tintable windows may operate using liquid crystal devices, suspended particle devices, microelectromechanical systems (MEMS) devices (such as microshutters), or any technology known now, or later developed, that is configured to control light transmission through a window. Windows (e.g., with MEMS devices for tinting) are described in U.S. Pat. No. 10,359,681 B2, issued Jul. 23, 2019, filed May 15, 2015, titled "MULTI-PANE WINDOWS INCLUDING ELECTROCHROMIC DEVICES AND ELECTROMECHANICAL SYSTEMS DEVICES," and incorporated herein by reference in its entirety. In some cases, one or more tintable windows can be located within the interior of a building, e.g., between a conference room and a hallway. In some cases, one or more tintable windows can be used in automobiles, trains, aircraft, and other vehicles, e.g., in lieu of a passive and/or non-tinting window.

In some embodiments, the tintable window comprises an electrochromic device (referred to herein as an "EC device" (abbreviated herein as ECD), or "EC"). An EC device may comprise at least one coating that includes at least one layer. The at least one layer can comprise an electrochromic material. In some embodiments, the electrochromic material exhibits a change from one optical state to another, e.g., when an electric potential is applied across the EC device. The transition of the electrochromic layer from one optical state to another optical state can be caused, e.g., by reversible, semi-reversible, or irreversible ion insertion into the electrochromic material (e.g., by way of intercalation) and a corresponding injection of charge-balancing electrons. For example, the transition of the electrochromic layer from one optical state to another optical state can be caused, e.g., by a reversible ion insertion into the electrochromic material (e.g., by way of intercalation) and a corresponding injection of charge-balancing electrons. Reversible may be for the expected lifetime of the ECD. Semi-reversible refers to a measurable (e.g. noticeable) degradation in the reversibility of the tint of the window over one or more tinting cycles. In some instances, a fraction of the ions responsible for the optical transition is irreversibly bound up in the electrochromic material (e.g., and thus the induced (altered) tint state of the window is not reversible to its original tinting state). In various EC devices, at least some (e.g., all) of the irreversibly bound ions can be used to compensate for "blind charge" in the material (e.g., ECD).

In some implementations, suitable ions include cations. The cations may include lithium ions (Li+) and/or hydrogen ions (H+) (i.e., protons). In some implementations, other ions can be suitable. Intercalation of the cations may be into an (e.g., metal) oxide. A change in the intercalation state of the ions (e.g. cations) into the oxide may induce a visible change in a tint (e.g., color) of the oxide. For example, the oxide may transition from a colorless to a colored state. For example, intercalation of lithium ions into tungsten oxide ($WO3-y$ ($0 < y \leq \sim 0.3$)) may cause the tungsten oxide to change from a transparent state to a colored (e.g., blue) state. EC device coatings as described herein are located within the viewable portion of the tintable window such that the tinting of the EC device coating can be used to control the optical state of the tintable window.

Figure 7A:
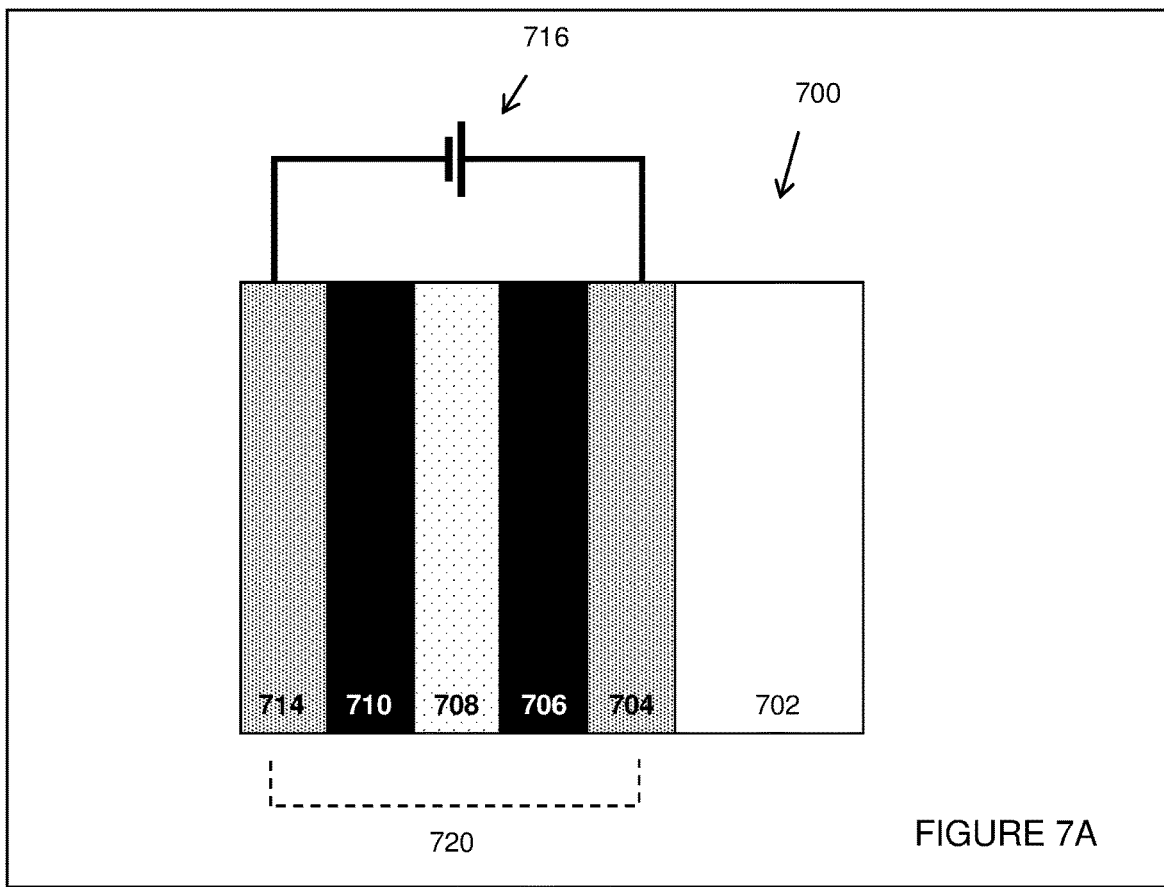
FIGS. 7A and 7B schematically show an electrochromic device and a cross section of an Integrated Glass Unit (IGU), respectively.

FIG. 7A shows an example of a schematic cross-section of an electrochromic device 700 in accordance with some embodiments. The EC device coating is attached to a substrate 702, a transparent conductive layer (TCL) 704, an electrochromic layer (EC) 706 (sometimes also referred to as a cathodically coloring layer or a cathodically tinting layer), an ion conducting layer or region (IC) 708, a counter electrode layer (CE) 710 (sometimes also referred to as an anodically coloring layer or anodically tinting layer), and a second TCL 714.

Elements 704, 706, 708, 710, and 714 are collectively referred to as an electrochromic stack 720. A voltage source 716 operable to apply an electric potential across the electrochromic stack 720 effects the transition of the electrochromic coating from, e.g., a clear state to a tinted state. In other embodiments, the order of layers is reversed with respect to the substrate. That is, the layers are in the following order: substrate, TCL, counter electrode layer, ion conducting layer, electrochromic material layer, TCL.

In various embodiments, the ion conductor region (e.g., 708) may form from a portion of the EC layer (e.g., 706) and/or from a portion of the CE layer (e.g., 710). In such embodiments, the electrochromic stack (e.g., 720) may be deposited to include cathodically coloring electrochromic material (the EC layer) in direct physical contact with an anodically coloring counter electrode material (the CE layer). The ion conductor region (sometimes referred to as an interfacial region, or as an ion conducting substantially electronically insulating layer or region) may form where the EC layer and the CE layer meet, for example through heating and/or other processing steps. Examples of electrochromic devices (e.g., including those fabricated without depositing a distinct ion conductor material) can be found in U.S. patent application Ser. No. 13/462,725 filed May 2, 2012, titled "ELECTROCHROMIC DEVICES," that is incorporated herein by reference in its entirety. In some embodiments, an EC device coating may include one or more additional layers such as one or more passive layers. Passive layers can be used to improve certain optical properties, to provide moisture, and/or to provide scratch resistance. These and/or other passive layers can serve to hermetically seal the EC stack 720. Various layers, including transparent conducting layers (such as 704 and 714), can be treated with anti-reflective and/or protective layers (e.g., oxide and/or nitride layers).

In certain embodiments, the electrochromic device is configured to (e.g., substantially) reversibly cycle between a clear state and a tinted state. Reversible may be within an expected lifetime of the ECD. The expected lifetime can be at least about 5, 10, 15, 25, 50, 75, or 100 years. The expected lifetime can be any value between the aforementioned values (e.g., from about 5 years to about 100 years, from about 5 years to about 50 years, or from about 50 years to about 100 years). A potential can be applied to the electrochromic stack (e.g., 720) such that available ions in the stack that can cause the electrochromic material (e.g., 706) to be in the tinted state reside primarily in the counter electrode (e.g., 710) when the window is in a first tint state (e.g., clear). When the potential applied to the electrochromic stack is reversed, the ions can be transported across the ion conducting layer (e.g., 708) to the electrochromic material and cause the material to enter the second tint state (e.g., tinted state).

It should be understood that the reference to a transition between a clear state and tinted state is non-limiting and suggests only one example, among many, of an electrochromic transition that may be implemented. Unless otherwise specified herein, whenever reference is made to a clear-tinted transition, the corresponding device or process encompasses other optical state transitions such as non-reflective-reflective, and/or transparent-opaque. In some embodiments, the terms "clear" and "bleached" refer to an optically neutral state, e.g., untinted, transparent and/or translucent. In some embodiments, the "color" or "tint" of an electrochromic transition is not limited to any wavelength or range of wavelengths. The choice of appropriate electrochromic material and counter electrode materials may govern the relevant optical transition (e.g., from tinted to untinted state).

In certain embodiments, at least a portion (e.g., all of) the materials making up electrochromic stack are inorganic, solid (i.e., in the solid state), or both inorganic and solid. Because various organic materials tend to degrade over time, particularly when exposed to heat and UV light as tinted building windows are, inorganic materials offer an advantage of a reliable electrochromic stack that can function for extended periods of time. In some embodiments, materials in the solid state can offer the advantage of being minimally contaminated and minimizing leakage issues, as materials in the liquid state sometimes do. One or more of the layers in the stack may contain some amount of organic material (e.g., that is measurable). The ECD or any portion thereof (e.g., one or more of the layers) may contain little or no measurable organic matter. The ECD or any portion thereof (e.g., one or more of the layers) may contain one or more liquids that may be present in little amounts. Little may be of at most about 100 ppm, 10 ppm, or 1 ppm of the ECD. Solid state material may be deposited (or otherwise formed) using one or more processes employing liquid components, such as certain processes employing sol-gels, physical vapor deposition, and/or chemical vapor deposition.

Figure 7B:
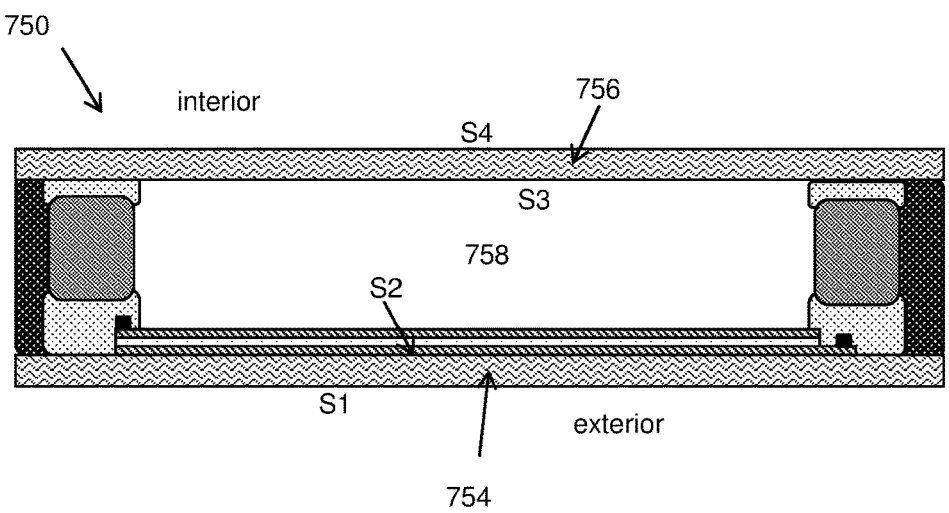

FIG. 7B show an example of a cross-sectional view of a tintable window embodied in an insulated glass unit ("IGU") 750, in accordance with some implementations. The terms "IGU," "tintable window," and "optically switchable window" can be used interchangeably herein. It can be desirable to have IGUs serve as the fundamental constructs for holding electrochromic panes (also referred to herein as "lites") when provided for installation in a building. An IGU lite may be a single substrate or a multi-substrate construct. The lite may comprise a laminate, e.g., of two substrates. IGUs (e.g., having double- or triple-pane configurations) can provide a number of advantages over single pane configurations. For example, multi-pane configurations can provide enhanced thermal insulation, noise insulation, environmental protection and/or durability, when compared with single-pane configurations. A multi-pane configuration can provide increased protection for an ECD. For example, the electrochromic films (e.g., as well as associated layers and conductive interconnects) can be formed on an interior surface of the multi-pane IGU and be protected by an inert gas fill in the interior volume (e.g., 758) of the IGU. The inert gas fill may provide at least some (heat) insulating function for an IGU. Electrochromic IGUs may have heat blocking capability, e.g., by virtue of a tintable coating that absorbs (and/or reflects) heat and light.

In some embodiments, an "IGU" includes two (or more) substantially transparent substrates. For example, the IGU may include two panes of glass. At least one substrate of the IGU can include an electrochromic device disposed thereon. The one or more panes of the IGU may have a separator disposed between them. An IGU can be a hermetically sealed construct, e.g., having an interior region that is isolated from the ambient environment. A "window assembly" may include an IGU. A "window assembly" may include a (e.g., stand-alone) laminate. A "window assembly" may include one or more electrical leads, e.g., for connecting the IGUs and/or laminates. The electrical leads may operatively couple (e.g. connect) one or more electrochromic devices to a voltage source, switches and the like, and may include a frame that supports the IGU or laminate. A window assembly may include a window controller, and/or components of a window controller (e.g., a dock).

FIG. 7B shows an example implementation of an IGU 750 that includes a first pane 754 having a first surface S1 and a second surface S2. In some implementations, the first surface S1 of the first pane 754 faces an exterior environment, such as an outdoors or outside environment. The IGU 750 also includes a second pane 756 having a first surface S3 and a second surface S4. In some implementations, the second surface (e.g., S4) of the second pane (e.g., 756) faces an interior environment, such as an inside environment of a home, building, vehicle, or compartment thereof (e.g., an enclosure therein such as a room).

In some implementations, the first and the second panes (e.g., 754 and 756) are transparent or translucent, e.g., at least to light in the visible spectrum. For example, each of the panes (e.g., 754 and 756) can be formed of a glass material. The glass material may include architectural glass, and/or shatter-resistant glass. The glass may comprise a silicon oxide ($SO_x$). The glass may comprise a soda-lime glass or float glass. The glass may comprise at least about 75% silica ($SiO_2$). The glass may comprise oxides such as $Na_2O$, or CaO. The glass may comprise alkali or alkali-earth oxides. The glass may comprise one or more additives. The first and/or the second panes can include any material having suitable optical, electrical, thermal, and/or mechanical properties. Other materials (e.g., substrates) that can be included in the first and/or the second panes are plastic, semi-plastic and/or thermoplastic materials, for example, poly(methyl methacrylate), polystyrene, polycarbonate, allyl diglycol carbonate, SAN (styrene acrylonitrile copolymer), poly(4-methyl-1-pentene), polyester, and/or polyamide. The first and/or second pane may include mirror material (e.g., silver). In some implementations, the first and/or the second panes can be strengthened. The strengthening may include tempering, heating, and/or chemically strengthening.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method for automatically updating firmware of a device operatively coupled to a power-line communications network, the method comprising:
   maintaining a database identifying different devices;
   collecting validated firmware updates for the different devices;
   storing the firmware updates as images in an updated manager;
   matching (a) a firmware update among the firmware updates for the different devices with (b) the device of a device ensemble among a plurality of device ensembles, which device ensemble comprises the different devices, wherein the plurality of device ensembles is coupled to the power-line communications network, wherein the device facilitates control of an environmental characteristic of an enclosure;
   receiving a signal from an occupancy sensor indicating that the enclosure is unoccupied; initiating a handshake of the firmware update among the firmware updates with the device, invoking the respective update engine of the firmware update among the firmware updates in the device;
   updating the device with the firmware update by a transceiver, which updating is provided over the power-line communications in a coaxial cable network branch which simultaneously powers the device; and
   forwarding, by the device, a confirmation message including a version information for the installed firmware-update image.

2. The method of claim 1, wherein the device ensemble comprises (I) a plurality of sensors or (II) a sensor and an emitter.

3. The method of claim 1, wherein the different devices comprise at least two devices that differ in their device type.

4. The method of claim 1, wherein the device, the device ensemble, and/or the different devices, have bidirectional communication over the network with the update manager.

5. The method of claim 4, wherein the update manager is included in a controller operatively coupled to the network, which controller is disposed in a facility in which the plurality of device ensembles is located.

6. The method of claim 5, wherein the update manager is included in a controller disposed externally relative to the facility, and is coupled to the network by a cloud connection.

7. The method of claim 4, wherein the bidirectional communication includes (1) the update manager initiating at least one handshake with at least one of the devices, (2) the update manager invoking an update engine in at least one of the devices, and/or (3) the update manager transferring at least one firmware update to at least one of the devices.

8. The method of claim 1, further comprising (1) recognizing the device and corresponding firmware version configured to execute on the device, and (2) targeting the device for updating by distributing firmware update to replace the version executing on the device.

9. The method of claim 8, wherein recognizing the device is adapted according to the devices in a facility in which the plurality of device ensembles is disposed.

10. The method of claim 8, further comprising providing a status report from the device targeted for updating to an update manager according to progress of replacing the version executing on the device.

11. The method of claim 1, wherein the device is a first device, and wherein the method further comprises distributing a first firmware updates of the firmware update from the first device receiving the first firmware update, to a second device for updating the second device to replace a version executing on the second device of the plurality of device ensembles.

12. The method of claim 11, wherein the second device is of the device ensemble.

13. The method of claim 11, wherein the device ensemble is a first device ensemble, and wherein the second device is of a second device ensemble included in the plurality of device ensembles.

14. The method of claim 1, wherein the different devices are a first set of different devices, wherein the plurality of device ensembles comprises a second set of different devices, wherein different device ensembles of the plurality of device ensembles include the second set of the different devices that are of a same type, and wherein at least two devices of the second set of different devices each receives the firmware update separately.

15. The method of claim 1, wherein the plurality of device ensembles comprises a first device ensemble including a first device, and a second device ensemble including a second device that is of a same type of the first device, and wherein the first device and the second device receive the firmware update separately.

16. An apparatus for automatically updating firmware of devices operatively coupled to a power-line communications network, the apparatus comprising at least one controller comprising circuitry, with at least one controller configured to:
maintain a database identifying the devices;
collect validated firmware updates for the devices;
storing the firmware updates as images in an update manager;
operatively couple to the power-line communications network that is operatively coupled to a plurality of device ensembles including a device ensemble having different devices;
match, or direct match of, (a) a firmware update among the firmware updates for the different devices with (b) a device, wherein the device facilitates control of an environmental characteristic of an enclosure;
receive a signal from an occupancy sensor indicating that the enclosure is unoccupied, initiating a handshake of the firmware update among the firmware updates with the device, invoking the respective update engine of the firmware update among the firmware updates in the device;
update, or direct update of, the device with the firmware update by a transceiver, which update is provided over the power-line communications in a coaxial cable network branch which simultaneously powers the device; and
forwarding, by the device, a confirmation message including a version information for the installed firmware-update image.

17. The apparatus of claim 16, wherein the at least one controller is further configured to store the firmware updates as images in an update manager, and wherein the device, the device ensemble, and/or the different devices, have bidirectional communication over the network with the update manager.

18. A method for updating firmware of a specific firmware-driven device in a power-line communications network, the method comprising:
maintaining a database identifying firmware-driven devices in the power-line communications network, wherein the firmware-driven devices include a respective update engine;
collecting validated firmware-update images for respective ones of the firmware-driven devices;
selecting firmware-driven devices with respective firmware-update images to be updated;
commanding a firmware-update manager coupled to the power-line communications network to coordinate updating the specific device within the firmware-driven devices, wherein the firmware-update manager communicated with the respective update engine, wherein the specific device facilitates control of an environmental characteristic of an enclosure;
receiving a signal from an occupancy sensor indicating that the enclosure is unoccupied;
the firmware-update manager initiating a handshake with the specific device;
the firmware-update manager invoking the respective update engine in the specific device;
the firmware-update manager transferring, by a transceiver, a respective firmware-update image to the specific device over the power-line communications in a coaxial cable network branch which simultaneously powers the device;
the specific device installing the respective firmware-update image; and
the specific device forwarding a confirmation message to the firmware-update manager including a version information for the installed firmware-update image.

19. The method of claim 18, wherein selection of the firmware-driven devices to be updated comprises (i) matching firmware-driven devices with respective firmware-update images that are not yet installed, (ii) offering available updates to a user via a user interface, and (iii) the user selecting a matched firmware-driven device and respective firmware-update image.

20. The method of claim 18, wherein the firmware-driven devices include at least one group of identical devices which utilize identical firmware, wherein the validated firmware-update images include a common firmware image for the group and wherein the method further comprises collectively launching updating of the group with the common firmware image.

* * * * *